US009072021B2

(12) United States Patent
Cai et al.

(10) Patent No.: US 9,072,021 B2
(45) Date of Patent: Jun. 30, 2015

(54) METHOD AND APPARATUS FOR HYBRID AUTOMATIC REPEAT REQUEST OPERATION IN A HETEROGENEOUS NETWORK ARCHITECTURE

(71) Applicant: RESEARCH IN MOTION LIMITED, Waterloo (CA)

(72) Inventors: Zhijun Cai, Euless, TX (US); Yi Song, Plano, TX (US); Chandra Sekhar Bontu, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 114 days.

(21) Appl. No.: 13/720,801

(22) Filed: Dec. 19, 2012

(65) Prior Publication Data

US 2014/0169238 A1    Jun. 19, 2014

(51) Int. Cl.
*H04W 4/00* (2009.01)
*H04W 36/20* (2009.01)

(52) U.S. Cl.
CPC .................................... *H04W 36/20* (2013.01)

(58) Field of Classification Search
None
See application file for complete search history.

(56) References Cited

U.S. PATENT DOCUMENTS

| 7,953,042 | B2 | 5/2011 | Kwak et al. |
|---|---|---|---|
| 8,279,835 | B2 | 10/2012 | Sun et al. |
| 2008/0009243 | A1 | 1/2008 | Hart |
| 2008/0085703 | A1 | 4/2008 | Michaelsen et al. |
| 2008/0287155 | A1 | 11/2008 | Xu et al. |
| 2009/0170509 | A1 | 7/2009 | Cai et al. |
| 2009/0238098 | A1 | 9/2009 | Cai et al. |
| 2009/0239525 | A1 | 9/2009 | Cai et al. |
| 2009/0286566 | A1 | 11/2009 | Lindholm et al. |
| 2009/0310554 | A1 | 12/2009 | Sun et al. |
| 2010/0022184 | A1 | 1/2010 | Khoshnevis et al. |
| 2010/0054208 | A1 | 3/2010 | Kojima |
| 2010/0105404 | A1 | 4/2010 | Palanki et al. |
| 2010/0110964 | A1* | 5/2010 | Love et al. ..................... 370/312 |
| 2010/0265915 | A1 | 10/2010 | Sun et al. |

(Continued)

FOREIGN PATENT DOCUMENTS

| JP | 2009177628 A | 8/2009 |
|---|---|---|
| WO | 2011035420 A1 | 3/2011 |

(Continued)

OTHER PUBLICATIONS

3GPP TS36.331 V10.1.0 3rd Generation Partnership Project; Technical Specification Group Radio Access Network; Evolved Universal Terrestrial Radio Access (E-UTRA); Radio Resource Control (RRC); Protocol specification (Release 10); Mar. 2011.

(Continued)

*Primary Examiner* — Otis L Thompson, Jr.
(74) *Attorney, Agent, or Firm* — Fish & Richardson P.C.

(57) ABSTRACT

Methods, systems and apparatus are provided for camping, assisted serving cell addition or removal, and discontinuous reception (DRX) in networks having a macro cell and at least one assisted serving cell. In other aspects, enhancements to Layer 1 channels and uplink timing alignments are provided in networks having a macro cell and at least one assisted serving cell. In further aspects, assisted serving cell Layer 2 architecture and transport channels are provided in networks having a macro cell and at least one assisted serving cell. In further aspects, collaborated HARQ solutions are provided in networks having a macro cell and at least one assisted serving cell.

30 Claims, 20 Drawing Sheets

(56) References Cited

U.S. PATENT DOCUMENTS

| | | | |
|---|---|---|---|
| 2010/0304665 A1 | 12/2010 | Higuchi | |
| 2010/0322180 A1 | 12/2010 | Kim et al. | |
| 2010/0323711 A1 | 12/2010 | Damnjanovic et al. | |
| 2010/0329188 A1 | 12/2010 | Jen | |
| 2011/0096701 A1 | 4/2011 | Lin | |
| 2011/0103330 A1 | 5/2011 | Montojo et al. | |
| 2011/0105162 A1 | 5/2011 | Kim et al. | |
| 2011/0110251 A1* | 5/2011 | Krishnamurthy et al. | 370/252 |
| 2011/0170496 A1 | 7/2011 | Fong et al. | |
| 2011/0207485 A1 | 8/2011 | Dimou et al. | |
| 2011/0310802 A1* | 12/2011 | Song et al. | 370/328 |
| 2011/0312316 A1 | 12/2011 | Baldemair et al. | |
| 2011/0319066 A1* | 12/2011 | Chou et al. | 455/422.1 |
| 2012/0087257 A1* | 4/2012 | Larsson et al. | 370/252 |
| 2012/0108255 A1 | 5/2012 | Jo et al. | |
| 2012/0113812 A1* | 5/2012 | Ji et al. | 370/241 |
| 2012/0129527 A1 | 5/2012 | Takeuchi et al. | |
| 2012/0176955 A1 | 7/2012 | Ishii et al. | |
| 2012/0196603 A1 | 8/2012 | Mochizuki et al. | |
| 2012/0201162 A1 | 8/2012 | Kim et al. | |
| 2012/0244864 A1 | 9/2012 | Fujii | |
| 2012/0257570 A1 | 10/2012 | Jang et al. | |
| 2012/0258724 A1 | 10/2012 | Kim et al. | |
| 2012/0263145 A1 | 10/2012 | Marinier et al. | |
| 2012/0282964 A1 | 11/2012 | Xiao et al. | |
| 2012/0300743 A1* | 11/2012 | Kim et al. | 370/329 |
| 2012/0329188 A1 | 12/2012 | Sonoda et al. | |
| 2013/0136095 A1 | 5/2013 | Nishio et al. | |
| 2013/0201930 A1* | 8/2013 | Okino et al. | 370/329 |
| 2013/0223366 A1* | 8/2013 | Papasakellariou et al. | 370/329 |
| 2013/0310059 A1 | 11/2013 | Parkvaii et al. | |
| 2013/0344913 A1* | 12/2013 | Li et al. | 455/522 |
| 2014/0092865 A1 | 4/2014 | Heo et al. | |
| 2014/0169284 A1 | 6/2014 | Cai et al. | |
| 2014/0171054 A1 | 6/2014 | Cai et al. | |
| 2014/0171091 A1 | 6/2014 | Cai et al. | |
| 2014/0192740 A1* | 7/2014 | Ekpenyong et al. | 370/329 |
| 2014/0198655 A1 | 7/2014 | Ishii et al. | |
| 2014/0211647 A1* | 7/2014 | Li | 370/252 |
| 2014/0211739 A1 | 7/2014 | Kim et al. | |
| 2014/0314001 A1* | 10/2014 | Sambhwani et al. | 370/329 |

FOREIGN PATENT DOCUMENTS

| | | | |
|---|---|---|---|
| WO | 2011100548 A1 | 8/2011 | |
| WO | 2012124958 A2 | 9/2012 | |

OTHER PUBLICATIONS

3GPP TS36.321 V10.1.0 3rd Generation Partnership Project; Technical Specification Group Radio Access Network; Evolved Universal Terrestrial Radio Access (E-UTRA); Medium Access Control (MAC) protocol specification (Release 10); Mar. 2011.

3GPP TS36.213 V10.1.0 3rd Generation Partnership Project; Technical Specification Group Radio Access Network; Evolved Universal Terrestrial Radio Access (E-UTRA); Physical layer procedures (Release) Mar. 2011.

3GPP TS36.211 V10.1.0 3rd Generation Partnership Project; Technical Specification Group Radio Access Network; Evolved Universal Terrestrial Radio Access (E-UTRA); Physical Channels and Modulation (Release 10); Mar. 2011.

3GPP TS36.300 V10.1.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); Sep. 2010.

PCT Application No. PCT/US2011/024528, International Search Report and the Written Opinion of the International Searching Authority, mailed Jun. 15, 2011.

R3-121453, 3GPP TSG-RAN3 Meeting #76, "LS on UL Interference for CB ICIC Release 11", Prague, Czech Republic, May 21-25, 2012; obtained May 30, 2012.

English language Abstract and machine translation of JP2009177628; published Aug. 6, 2009; downloaded Mar. 13, 2013.

The International Search report and Written Opinion mailed May 13, 2013, in corresponding PCT patent application No. PCT/US12/72285.

The International Search report and Written Opinion mailed May 7, 2013, in corresponding PCT patent application No. PCT/US12/72291.

The International Search report and Written Opinion mailed May 17, 2013, in corresponding PCT patent application No. PCT/US12/72279.

The International Search report and Written Opinion mailed Mar. 19, 2013, in corresponding PCT patent application No. PCT/US12/72294.

Non-Final Office Action mailed Feb. 21, 2014; in U.S. Appl. No. 13/720,783.

Non-Final Office Action mailed Jan. 13, 2014; in U.S. Appl. No. 13/720,750.

International Search Report and the Written Opinion of the International Searching Authority, mailed Mar. 19, 2013, in PCT Application No. PCT/US12/72294.

Non-Final Office Action mailed Jun. 11, 2014; in corresponding U.S. Appl. No. 13/720,767.

Final Office Action mailed Sep. 10, 2014; in U.S Appl. No. 13/720,783.

Non-Final Office Action mailed Sep. 18, 2014; in U.S. Appl. No. 13/720,750.

Final Office Action mailed Nov. 17, 2014; in U.S. Appl. No. 13/720,767.

* cited by examiner

METHOD AND APPARATUS FOR HYBRID AUTOMATIC REPEAT REQUEST OPERATION IN A HETEROGENEOUS NETWORK ARCHITECTURE

FIELD OF THE DISCLOSURE

The present disclosure relates to small cells operating in conjunction with a macro cell, and in particular relates to initial access, idle mode procedures, Layer 1 control channel aspects, Layer 2/3 aspects and hybrid automatic repeat request (HARQ) procedures for a user equipment (UE) connected simultaneously to a plurality of serving cells.

BACKGROUND

A heterogeneous network may include a high power node with one or more low power nodes co-existing with the high power node. Low power nodes form small cells such as pico cells, femto cells and relay cells while high power nodes form macro cells, which in general have a much larger cell coverage than the small cells.

In order to improve capacity and cell edge performance of the macro cells, low power nodes may be introduced within the macro cell to form the small cells. In some scenarios, the density of the small cells may be quite high. In this scenario, mobility and associated overhead could become a concern for a UE, especially for users with medium to high mobility. For example, user equipment (UE) travelling quickly may experience frequent handovers when moving across the small cells. Specifically, as the UE moves closer to a small cell, handover conditions indicate to the UE that the UE should handover to that small cell. However, when the small cell has a small coverage, fast changing radio conditions exist at the small cell edge and due to the frequent handovers, handover failure rates could increase, thereby impacting overall mobility performance.

Further, interference issues exist between the high power and low power cells. To remove interference, one deployment could be that the small cells use a different frequency layer from the macro cells. For example, the macro cells may use a 700 Mhz frequency band while small cells use a 3.5 Ghz frequency band. However this is merely an example. Such deployment can be referred to as an inter-site carrier aggregation (CA) based scheme. In accordance with this deployment, interference issues may be relieved at least between the macro cells and the small cells.

BRIEF DESCRIPTION OF THE DRAWINGS

The present disclosure will be better understood with reference to the drawings, in which:

FIG. 2 is a block diagram showing communication to a user equipment in a macro cell but close to a closed subscriber group cell the user equipment is not a member of;

FIG. 8 is a process diagram of an example process for determining which cell a user equipment can camp on;

DETAILED DESCRIPTION OF THE DRAWINGS

The present disclosure provides a method at a user equipment operating in a network having a macro cell and at least one assisted serving cell, the method comprising: receiving downlink data from the macro cell on a predetermined number of hybrid automatic repeat request (HARQ) downlink processes; and sending uplink data to the macro cell on HARQ uplink processes associated with the downlink macro cell HARQ processes.

The present disclosure further provides a user equipment operating in a network having a macro cell and at least one assisted serving cell, the user equipment comprising: a processor; and a communications subsystem, wherein the user equipment is configured to: receive downlink data from the macro cell on a predetermined number of hybrid automatic repeat request (HARQ) downlink processes; and send uplink data to the macro cell on HARQ uplink processes associated with the downlink macro cell HARQ processes.

The present disclosure further provides a method at a macro cell operating in a network having at least one assisted serving cell, the method comprising: providing downlink data to a user equipment on a predetermined number of hybrid automatic repeat request (HARQ) downlink processes; and receiving uplink data from the user equipment on HARQ uplink processes associated with the downlink HARQ processes.

The present disclosure further provides a macro cell operating in a network having at least one assisted serving cell, the macro cell comprising: a processor; and a communications subsystem, wherein the macro cell is configured to: provide downlink data to a user equipment on a predetermined number of hybrid automatic repeat request (HARQ) downlink processes; and receive uplink data from the user equipment on HARQ uplink processes associated with the downlink HARQ processes.

Figure 1:
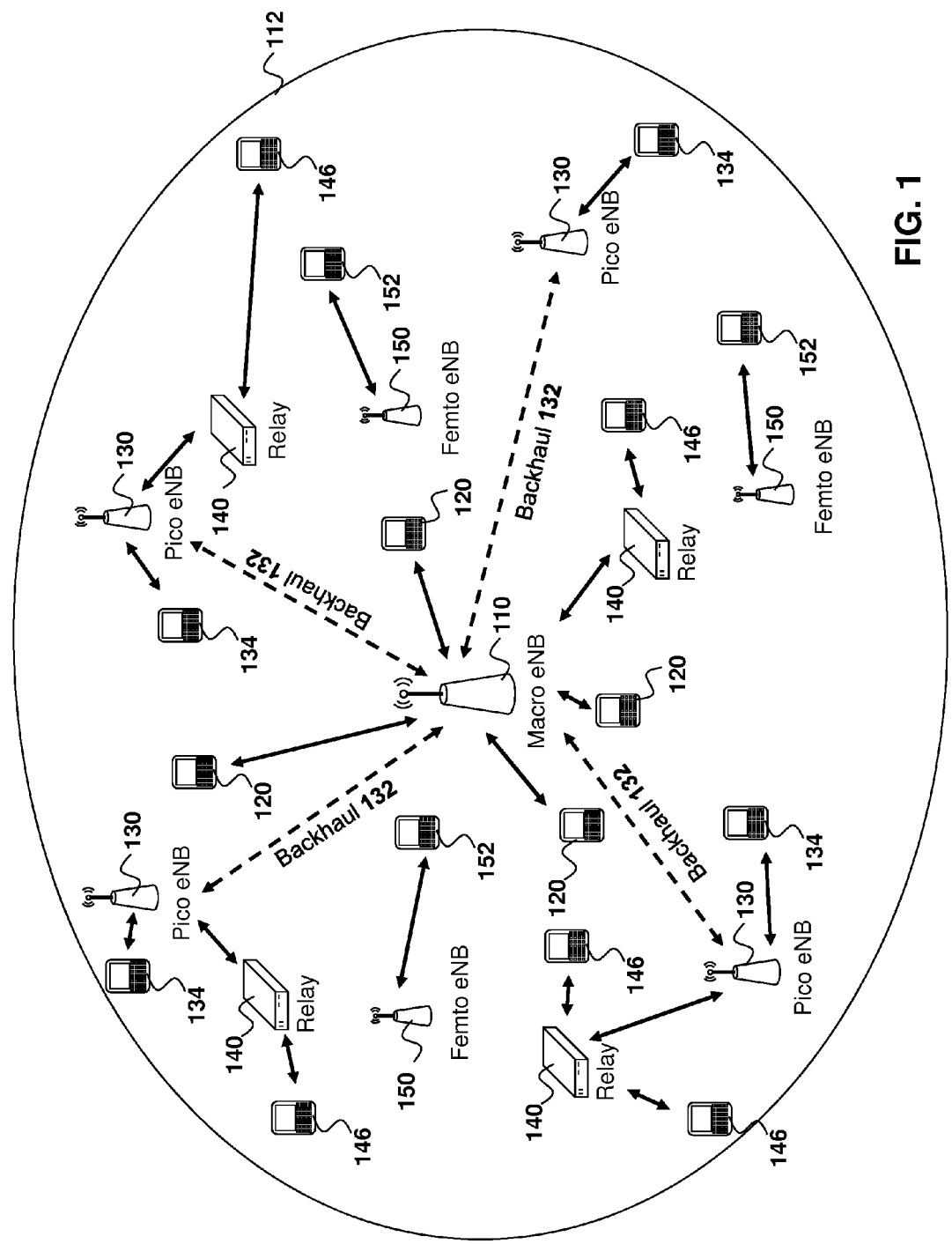
FIG. 1 is a block diagram showing an example heterogeneous network.

Reference is now made to FIG. 1, which shows an example of a dense Third Generation Partnership Project (3GPP) Long Term Evolution-Advanced (LTE-A) heterogeneous network deployment scenario. Such deployment may be used to increase capacity and enhance coverage of a macro cell, for example.

Capacity increase allows for more data transfer within a network. Data capacity requirements increase significantly over time, and may require doubling the data capacity every year. Some forecasts see a 1000 times capacity increase demand in cellular networks by the year 2020.

Further, coverage issues at cell edges of traditional macro cells are always a bottleneck for both downlink and the uplink.

One possible technique to resolve coverage and capacity issues is the deployment of a heterogeneous network where small cells such as pico cells, femto cells and relays may enhance both the network throughput and the cell edge coverage. In particular, referring to FIG. 1, a macro eNB 110 has a coverage area 112.

Some UEs, shown as UEs 120, communicate directly with macro eNB 110. However, in order to offload some UEs from macro eNB 110, small cells are introduced within macro cell coverage area 112.

In particular, in the example of FIG. 1, pico cells 130 provide small cell coverage. Pico cells 130 may be located near the cell edge or may be located in high density or high usage areas to offload some data capacity to the pico cells.

In the embodiment of FIG. 1, pico cells 130 include a backhaul 132 such as a fiber or microwave backhaul, for example, between macro eNB 110 and the pico eNB. UEs 134 communicate directly with pico cells 130. The backhaul could be wireless or wire line.

In other cases, a relay 140 may be connected to either macro eNB 110 or to a pico eNB 130. As will be appreciated, relays provide enhanced coverage area or enhanced throughput for UEs 146 connected to them.

In other embodiments, femto cells 150 may be located within the macro cell coverage area 112 and be connected to UEs 152.

While the present disclosure is described with regard to the Long Term Evolution (LTE) network architecture, the present disclosure is not limited to such a network architecture and could include other network architectures as well. The use of LTE is merely meant as an example.

Based on FIG. 1 above, a heterogeneous network is a network which, in some embodiments, is designed to provide uniform coverage or capacity to serve a non-uniform distribution of users and needs. It includes the macro cells and the low-power nodes such as pico cells, femto cells, and relays. The macro cells overlay the low power nodes or small cells, sharing the same frequency or having different frequencies. Small cells are utilized to offload capacity from macro cells, improve indoor and cell edge performance, among other functionalities. Thus, the $3^{rd}$ Generation Partnership Project working groups are studying heterogeneous networks for performance enhancement enablers in LTE-A.

In heterogeneous network deployments, inter-cell interference coordination (ICIC) is one consideration. To help with ICIC, time domain based resource sharing or coordination has been adopted and referred to as enhanced ICIC (eICIC). For eICIC, the interfering node adopts an Almost Blank Subframe (ABS) at certain points and co-ordinates this with the interfered with cells so that the interfered with cells may provide vital information to UEs connected to the cells during the Almost Blank Subframe in order to avoid interference from the interfering cell for such information.

Figure 2:
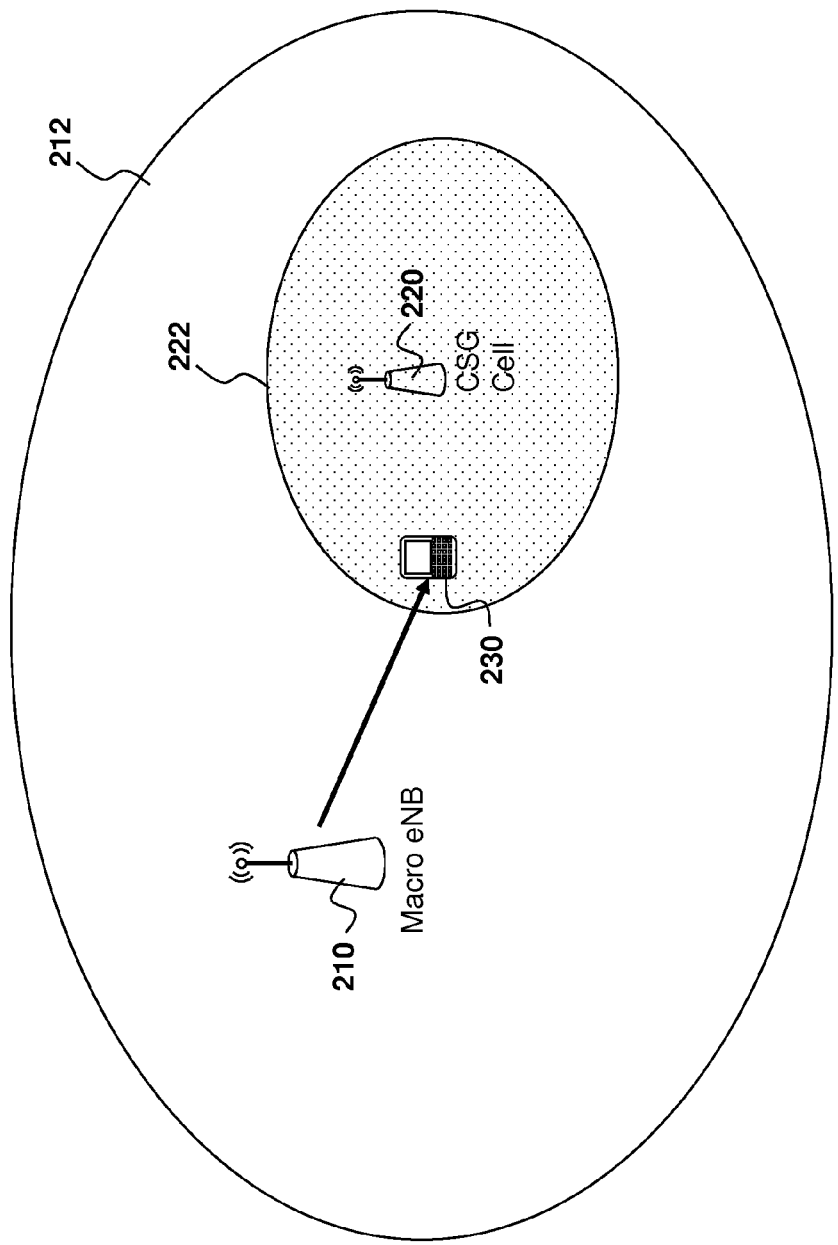

There are two main deployment scenarios where eICIC is utilized. The first is a Closed Subscriber Group (Femto cell) scenario. In this case, a dominant interference condition may happen when non-member users are in close proximity to the Closed Subscriber Group Cell. Reference is now made to FIG. 2.

As seen in FIG. 2, a macro eNB 210 includes a coverage area 212. Similarly, a CSG eNB 220 has a coverage area 222. A UE 230 that is not a member of the Closed Subscriber Group moves close to the CSG eNB 120 and thus receives significant interference from the CSG eNB 220.

Typically, Physical Downlink Control Channel (PDCCH) reception at a non-member UE 230 is severely interfered with by the downlink transmissions from the CSG eNB 220 to its member UEs. Interference to PDCCH reception of the macro eNB 210 for non-member UEs has a detrimental impact on both the uplink and downlink data transfer between the UE 230 and the macro eNB 210.

Additionally, other downlink control channels and reference signals, from both the macro cell and neighbor cells, that may be used for cell measurements and radio link monitoring are also interfered with by the downlink transmission from the CSG eNB 220 to its member UEs.

Depending on the network deployment and strategy, it may not be possible to divert the users suffering from inter-cell interference to another Evolved-Universal Terrestrial Radio Access (E-UTRA) carrier or other Radio Access Technology (RAT). In this case, time domain ICIC may be used to allow such non-member UEs to remain served by the macro eNB 210 on the same frequency layer. In this case, interference may be mitigated by the CSG eNB 220 utilizing an ABS to protect some of the corresponding macro cell's subframes from interference.

A non-member UE 130 may be signaled to utilize the protected resources for radio resource measurements (RRM), radio link monitoring (RLM) and Channel State Information (CSI) measurements for the serving cell, allowing the UE to continue to be served by the macro cell under otherwise strong interference from the CSG cell.

A second deployment scenario that eICIC may be utilized with is described below with regard to FIG. 3.

Figure 3:
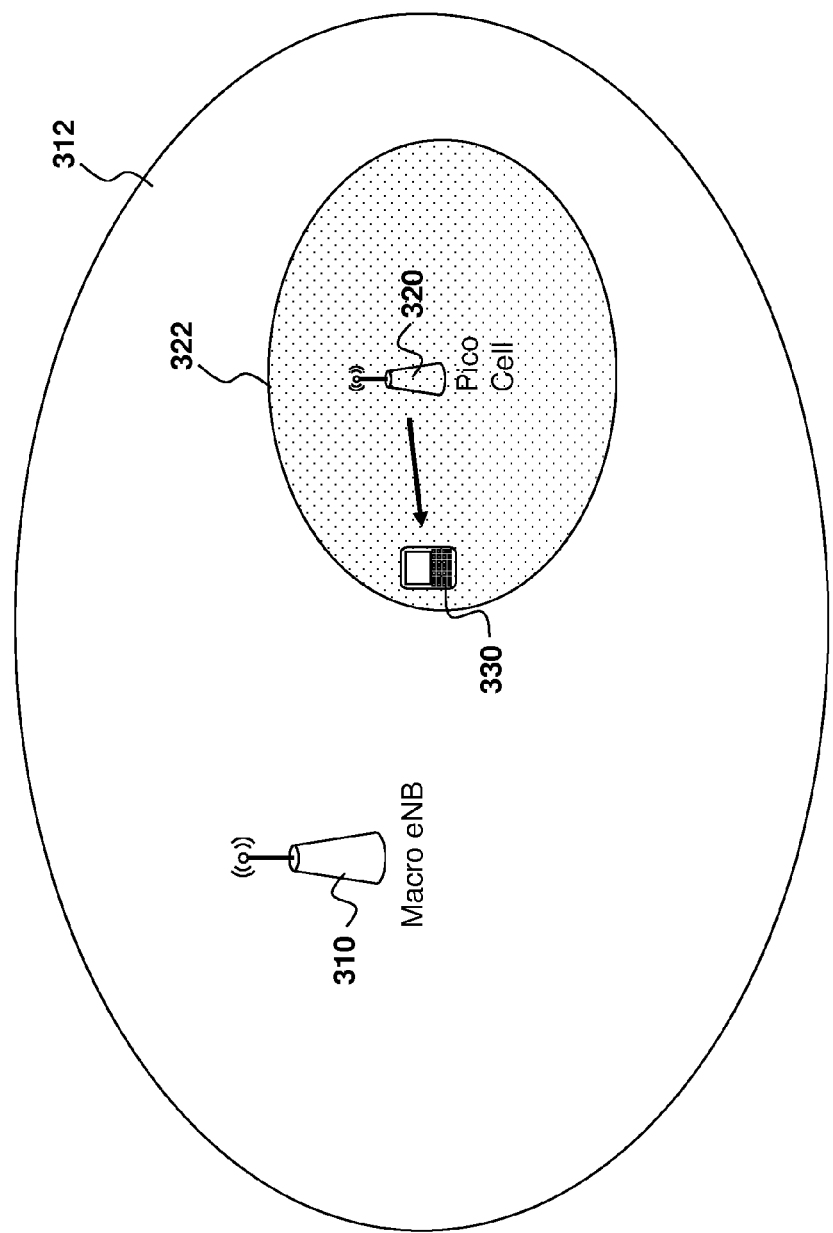
FIG. 3 is a block diagram showing communication to a user equipment in a pico cell but close to a the pico cell edge.

In the embodiment of FIG. 3, a macro eNB 310 has a coverage area 312. A pico eNB 320 has a coverage area 322. A UE 330 is connected to pico eNB 320 but is close to the pico cell edge.

In the scenario of FIG. 3, time domain ICIC may be utilized for pico cell users who are served in the edge of the serving pico cell. The pico UE may be still connected to the pico eNB 320 for the purpose of traffic offloading from the macro eNB 310 to pico eNB 320. Typically, the PDCCH would be severely interfered with by the downlink transmissions from the macro cell. In addition, other downlink control channels and reference signals from both the pico cell and neighbor cells, which may be used for cell measurements and radio link monitoring, are also interfered by the downlink transmission from the macro cell.

Time domain ICIC may be utilized to allow a UE such as UE 330 to remain served by the pico eNB 320 at an extended range on the same frequency layer. Such interference may be mitigated by the macro cell utilizing ABS to protect the corresponding pico cell's subframes from interference. A UE served by a pico cell uses the protected resources during the macro cell ABS for radio resource measurements, radio link monitoring and channel state information measurements for the serving pico cell and possibly for neighboring cells.

For time domain ICIC, subframe utilization across different cells is coordinated in time through either backhaul signaling or Over the Air Management (OAM) configuration of the ABS patterns. The ABSs in the aggressor cell are used to protect resources in subframes in the victim cell receiving strong inter-cell interference from the aggressor cell.

ABSs are subframes with reduced transmit power, and may include no transmissions in some cases, on some of the physical channels. In other embodiments the ABS has significantly reduced activity. The eNB ensures backward compatibility towards UEs by transmitting the necessary control channel and physical signals as well as System Information Patterns based on ABSs signaled to the UE to restrict the UE measurements to specific subframes, called time domain measurement resource restrictions. There are different patterns depending on the type of measured cell, including serving and neighboring cells, and the measurement type, including RRM, RLM, among others.

Figure 4:
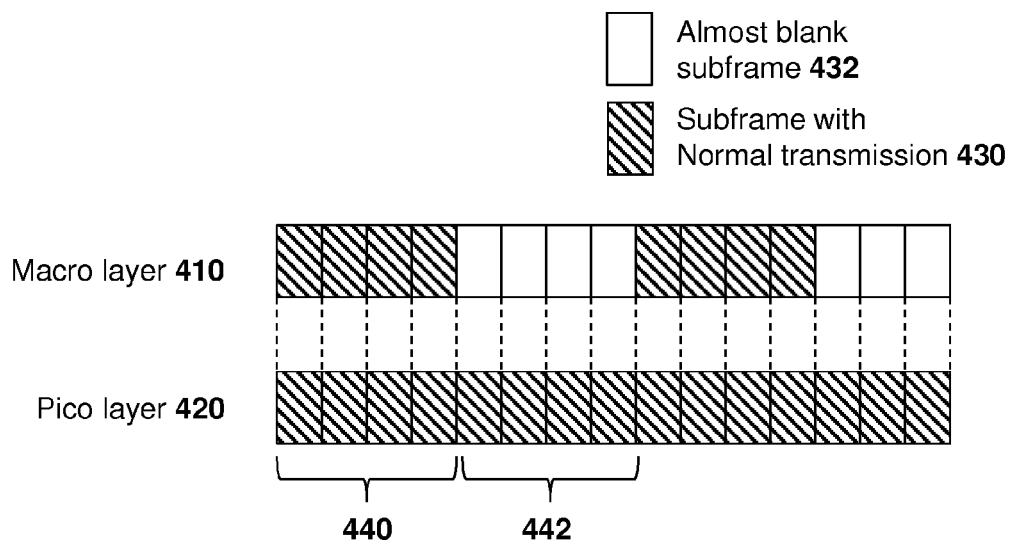
FIG. 4 is block diagram showing almost blank subframes on a macro cell.

One example of an ABS patterns for a pico scenario is shown below with regard to FIG. 4. In particular, FIG. 4 shows a macro layer 410 and a pico layer 420. Subframes with normal transmissions are shown with the shading at reference numeral 430 whereas subframes that are almost blank subframes are shown with the shading at reference numeral 432.

In the example of FIG. 4, a macro eNB is the aggressor cell and configures and transfers the ABS patterns to the pico eNB, which is the victim cell. The macro eNB schedules no data transmissions or low-power data transmissions in the ABS subframes to protect UEs served by the pico eNB at the cell edge of the pico cell.

The pico eNB may schedule transmission to and from the UEs in the cell center regardless of the ABS subframes because the interference from the macro cell is sufficiently low. Meanwhile the pico eNB may schedule transmission to and from the UEs at the edge of the pico cell only during the ABS subframe transmission from macro layer 410.

In particular, during the subframes marked with reference numeral 440, the pico node only schedules user equipments without excessive range extension, since the macro eNB is also active in these subframes.

Conversely, during the subframes marked with reference numeral 442, the macro eNB has almost blank subframes and the pico node can, in addition to UEs that are without excessive range extension, schedule users with large range extension offsets that would otherwise not be schedulable due to too high interference from the macro layer.

Figure 5:
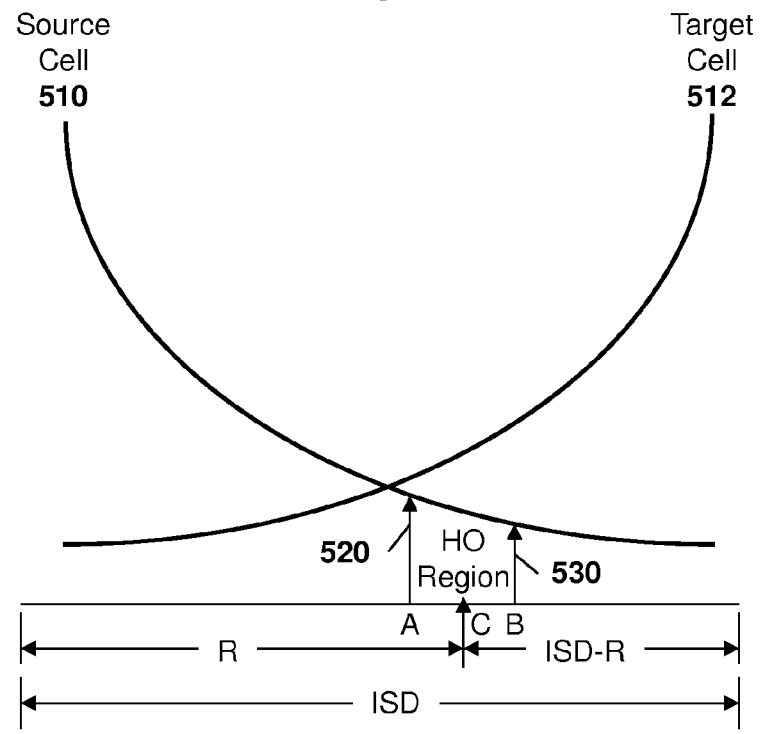
FIG. 5 is a plot showing signal strength of a source and target cell and providing a handover region.

One drawback of dense heterogeneous networks relates to mobility. Due to the different cell types in the heterogeneous network environment, mobility situation is more complicated than in a homogeneous network. Reference is now made to FIG. 5, which shows the handover region between the source cell and the target. The handover region is defined as the region between the point of an A3 event being triggered, to the point that radio link quality from the source cell is not sufficient for receiving a handover command.

In FIG. 5, the signal strength from source cell is shown by line 510 and the signal strength from the target cell is shown by line 512. The UE is connected to the source cell and is being transferred to a target cell.

Handover should not occur prior to a point shown by reference numeral 520. The point at reference numeral 520 is designated as "A" and is defined where the A3 event is triggered. The A3 event is triggered when the target power, designated as $P_{target}$, minus the source power, designated as $P_{source}$, is greater than or equal to the A3_offset. This is shown with equation 1 below.

$$P_{target} - P_{source} \geq A3\_offset \quad (1)$$

Handover should also not occur any later than the position shown by reference numeral 530 and designated as "B" in the example of FIG. 5. At the point designated by reference numeral 530 the PDCCH of the serving cell is out of coverage.

In a heterogeneous network environment where low power nodes are placed throughout a macro-cell layout, the size of the handover region depends on the cell type of the source the target cell. Further, the size of the handover region between a macro and a pico cell is far smaller than the size of the handover region between a macro to macro handover.

One example of handover region size of different types of handovers is shown below with regard to Table 1, where ΔR is the size of the handover region. Table 1 however shows exemplary values and is not necessarily definitive for each handover type.

TABLE 1

An example of HO region sizes of different types of HO

| source → target | size of HO region (unit: m) |
|---|---|
| Macro → Macro | ΔR = 22.5 |
| Pico → Pico | ΔR = 5.75 |
| Macro → Pico | ΔR = 2.375 |
| Pico → Macro | ΔR = 7 |

Therefore, in order to avoid handover failure, faster handover with a smaller time-to-transition is desirable if the handover involves a small cell.

Further, in heterogeneous networks, in order to offload traffic from the macro cells, pico cells may employ a range extension, where the UE will communicate with the pico cell even though the signal strength from the pico cell is weaker than that of the macro cell. As discussed above, to avoid interference from the macro cell, almost blank subframes are configured at the macro cell so that the UE in pico range expansion area can communicate with the pico cell. The handover region size may also depend on the range extension capabilities of the source and target cell.

Thus, in heterogeneous networks, there may be many low powered nodes co-existing with high powered nodes. To improve the capacity the density of the small cells could be quite high. This may create issues with regard to mobility and interference.

In one proposal by the 3$^{rd}$ Generation Partnership Project workgroup, a macro cell may use a first band for communication and the small cell may use a second band for communication. For example, the macro cell may use 700 Mhz while the small cells use 3.5 Ghz. However, this is not meant to be limiting and other deployment scenarios could also be employed. The use of two separate frequencies mitigates interference issues between the macro cell and small cells, but not between small cells.

Various embodiments are provided herein to mitigate mobility and interference issues.

In a first embodiment of the present disclosure, enhancements are provided to camping, assisted serving cell addition or removal, and discontinuous reception (DRX).

In a further embodiment, enhancements to Layer 1 channels and uplink timing alignments are provided.

In a further embodiment, assisted serving cell Layer 2 architecture and transport channels are provided.

In a further embodiment, collaborated HARQ solutions are provided.

Each is discussed in detail below.

Enhancements to Camping, Assisted Serving Cell Addition/Removal, and Discontinuous Reception To mitigate mobility and interference issues, in one embodiment of the present disclosure the UE can have multiple serving cells at the same time. Among these serving cells, one macro serving cell may operate in the low frequency band such as 700 Mhz. Further, one or more small serving cells may operate in a higher frequency band such as 3.5 Ghz.

The macro serving cell acts as the control serving cell, which at least controls the mobility function for the UE, including handover, idle mode mobility, among others.

The other serving cells act as the assisted serving cells and may provide user plane (U-plane) data communications. In this case, various enhancements to idle mode camping, assisted serving cell addition or removal procedures, and discontinuous reception are possible.

Figure 6:
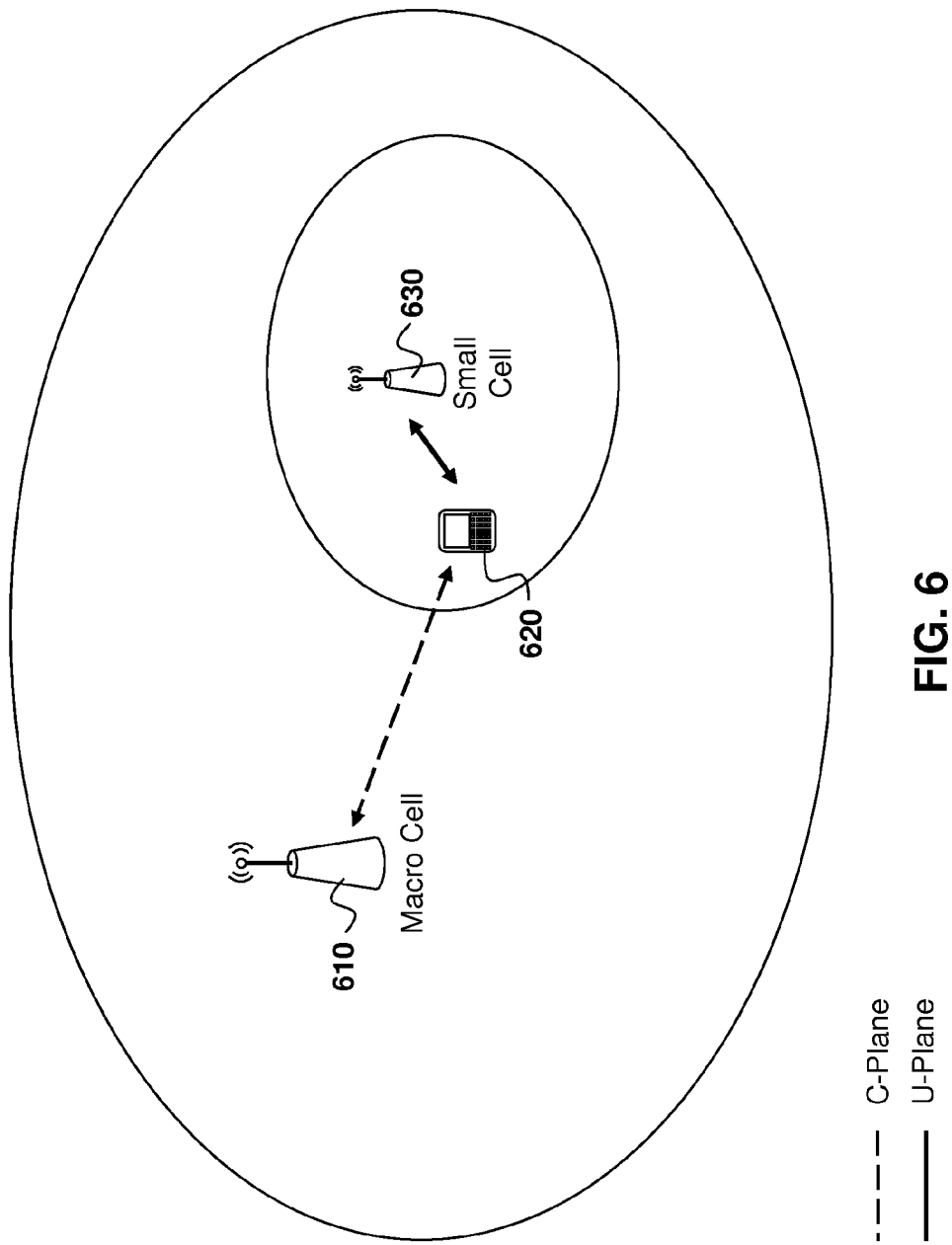
FIG. 6 is a block diagram showing example control and user plane communications between a user equipment, a macro cell and a small cell.

Reference is now made to FIG. 6, which shows an example system layout having a macro cell 610, a UE 620 and a small cell 630. In the embodiment of FIG. 6, control plane signaling exists between the macro cell 610 and the UE 620. Control plane (C-plane) signaling may mean the control signaling between the UE and the network, such as radio resource control (RRC) mobility control signaling.

U-plane signaling occurs between the UE 620 and small cell 630. U-plane signaling may mean user data exchange between the UE and network, such as stream video services, browsing, email exchange, among others.

In other embodiments, C-plane may mean RRC signaling radio bearers between the UE and network while the U-plane may mean the radio data bearers between the UE and the network.

Restricted Camping in the Idle Mode

When a UE does not have an active connection to a network, the UE is considered to be in idle mode. In idle mode, the UE will camp on a cell to receive paging and system broadcast information from that cell.

In accordance with one embodiment of the present disclosure, idle mode camping may be restricted. Two scenarios are discussed below.

In a first scenario, the small cell is a non-standalone carrier. This means that the small cell does not transmit certain cell information such as synchronization signals, and is therefore associated with a standalone carrier. In a second scenario, a standalone carrier for a small cell is discussed.

With regard to a non-standalone carrier for the small cell, the small cell may not need to transmit a primary synchronization signal (PSS), a secondary synchronization signal (SSS), a master information block (MIB), or system information block (SIB) information. In this case, the non-standalone small cell may rely on the macro cell to broadcast the system information.

Since the small cell provides no system information, the UE cannot camp on the non-standalone carrier small cell. Instead, the UE always camps on the macro cell. Thus, the UE only measures the reference signal receive power (RSRP)/reference signal received quality (RSRQ) from the macro cell and performs selection or reselection for the macro cells.

However, in some cases, a non-standalone carrier of a small cell may be configured to transmit PSS/SSS/MIB/SIB information as well. In this case, a mechanism is provided herein to restrict the UE from camping on the non-standalone carrier of the small cell.

In one embodiment, a time or frequency location of the PSS/SSS/MIB and/or system information block 1 (SIB1)/system information block 2 (SIB2) for the small cells may be different from the macro cells. In this case, UEs that do not implement the functionality of a standard that supports the proposed embodiment, herein referred to as legacy UEs, may not find the PSS/SSS/MIB and/or the SIB1/SIB2 transmissions from the small cells. UEs that support the proposed embodiments of the present disclosure are aware of the small cells based on the different time or frequency location of the system information, and know not to camp on these cells.

Thus a UE implementing the embodiment would check the time or frequency location of the system information received from a cell and make a determination that the cell is a small cell or a macro cell. The determination may be based on information stored at the UE, such as a predetermined or configured time or frequency location for a macro cell to send system information and if the time or frequency location for the system information differs from the predetermined or configured location then the cell is a small cell, for example.

In an alternative embodiment, the SIB may be used to indicate that the cells are "barred cells" or alternatively small cells that are not used for camping purposes. In this case, no UEs could camp on the cells. Paging functionality may not be provided in the small cells. The system information block may provide an explicit indication that the cell is a barred cell or that camping is not allowed on the cell in some embodiments.

In a further alternative embodiment, the MIB may consist of an additional bit to indicate whether or not the UE is allowed to camp on the cell. A UE supporting the embodiments of the present disclosure may start the initial camping procedure by detecting the PSS/SSS followed by the physical control format indicator channel (PCFICH) and then the MIB. Once the additional bit is detected, the UE may withdraw the camping process and try to camp on another cell.

In yet a further alternative embodiment, the macro cell could indicate that the some of the neighbor cells are small cells, and cannot be used for camping purposes. This could be done through SIB signalling or a particular physical cell identity (PCI) range identification from the macro cells. For example, SIB signalling of macro cells could notify the UEs of the small cell identifiers in the coverage area of the macro cell, and may also indicate whether the small cell could be used for camping purposes. In this case, for example, a one bit flag may be used. If the flag is set, no UEs would camp on the small cell and otherwise the small cell could be used for camping purposes. In other cases, the mere inclusion of the small cell identifier could be an indication to the UE to not camp on the small cell. Other examples are possible.

In a further example, the identifiers of small cells could occupy a certain range of PCIs or a new set of PCIs, as signaled by the macro cell. A UE could be configured to recognize that network cells within a certain PCI range are small cells and should not be camped on.

By restricting UEs from camping on the small cells, the UE could normally be directed to camp on the macro cells. In this case, cell selection or reselection rates can be reduced, since the UE only tries to select or reselect macro cells rather than the numerous small cells detected at the UE.

Further, non-standalone carriers are normally associated with a legacy carrier such as a macro cell, which normally has a better control channel coverage. Thus, the UE may be better to camp on the legacy carrier.

With the above, the macro cell may also temporarily handle U-plane traffic for a UE before an assisted serving cell is added for the UE.

With regard to a standalone carrier for the small cell, such small cells transmit system information such as PSS/SSS/MIB/SIB information and can be used for camping purposes for certain UEs. However, in order to avoid frequent cell selection or reselection, it may be better for the UE to only select or reselect macro cells, since the control channel coverage for the macro cells is normally better, especially when the macro cell uses a lower frequency than the small cells.

Figure 7:
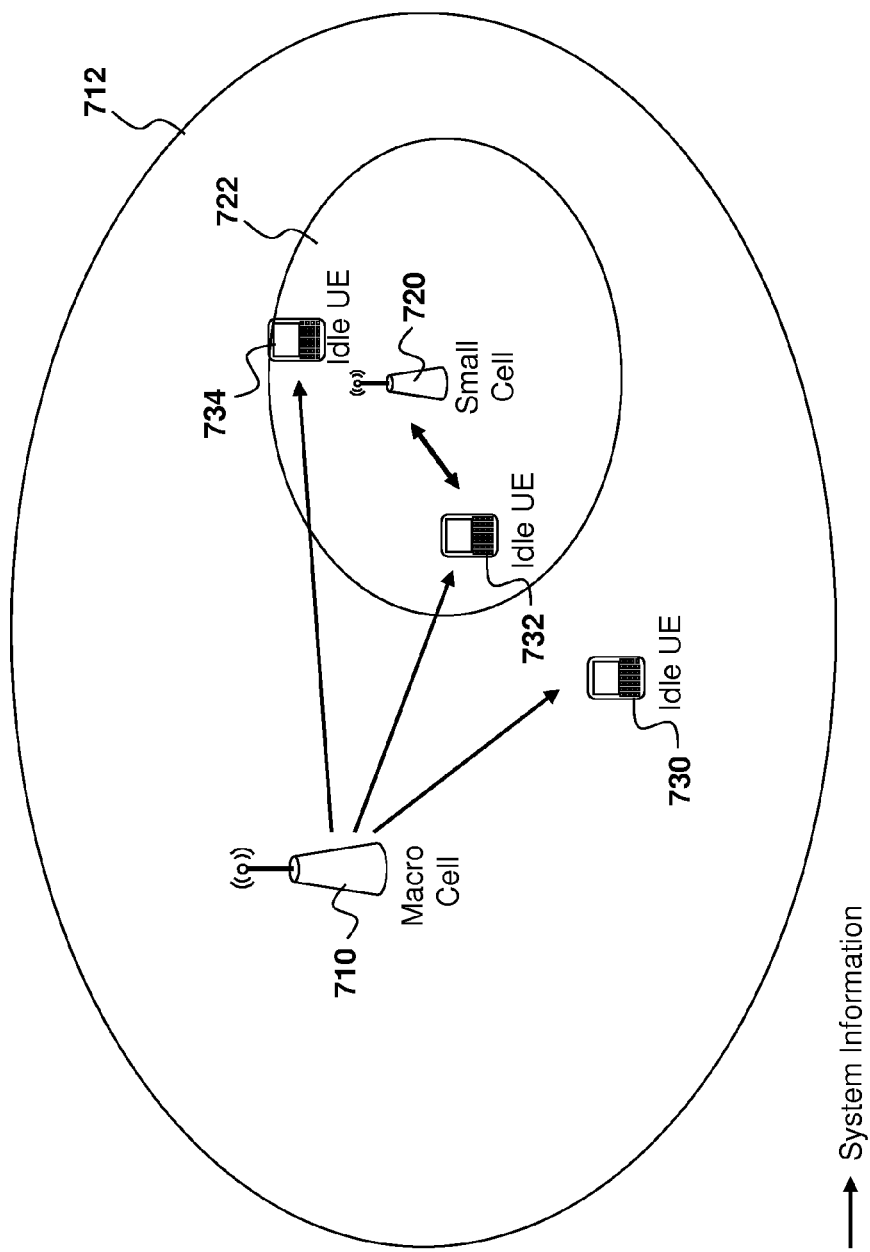
FIG. 7 is a block diagram showing an example user equipment camping scheme in which system information is provided from the macro cell.

In accordance with one embodiment of the present disclosure, a UE may only camp on the macro cell, even though a standalone carrier could be used for the small cell. Thus, referring to FIG. 7, a macro cell 710 and a small cell 720 exist within the coverage area 712 of macro cell 710.

Three idle mode UEs 730, 732 and 734 respectively are within the coverage area 712. Further UEs 732 and 734 are in the coverage area 722 of small cell 720.

However, since the UEs 730, 732 and 734 are in idle mode, in accordance with the above, all of these UEs camp on macro cell 710 rather than camping on small cell 720.

In one embodiment, all UEs implementing the embodiments of the present disclosure may restrict camping on small cells. In other embodiments signaling may be used to indicate to a UE that the UE should camp on macro cells only. Again the signaling could include any of the above methods for providing an indication, including using a flag within system information messages or higher level signaling while the UE is previously connected to a macro cell, among other examples. However, these indications are only examples, and any implicit or explicit indication could be used.

If macro cells and small cells are on different frequencies, the restricted camping on a small cell may also be achieved by setting a high reselection priority for the macro cell frequency and a low reselection priority for the small cell frequency.

Figure 8:
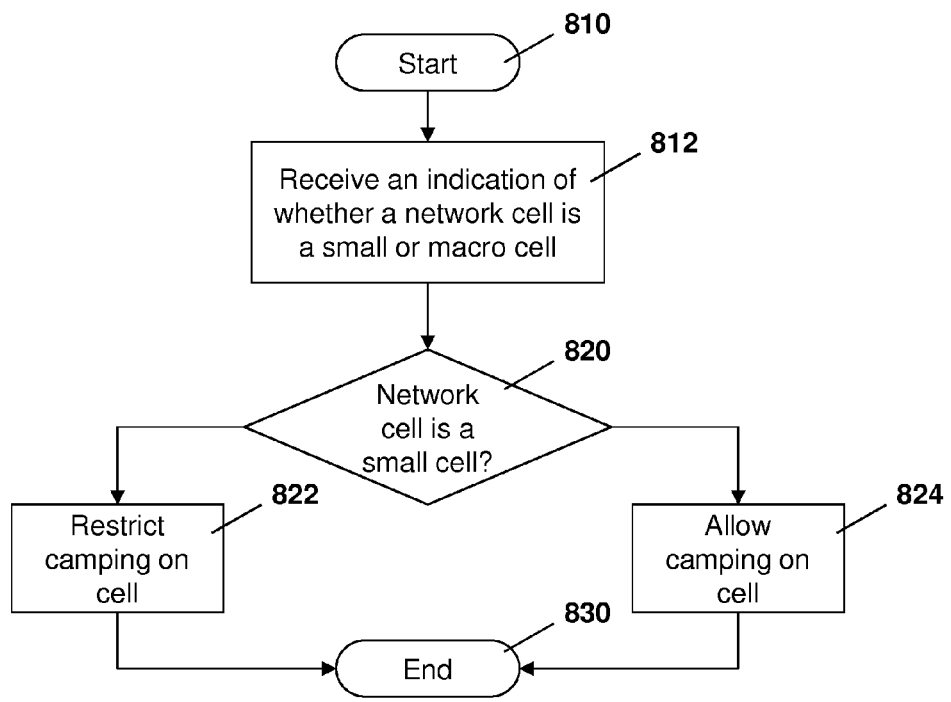

Reference is now made to FIG. 8, which shows a simplified process diagram for the embodiments described above. In particular, the process starts at block 810 and proceeds to block 812 in which user equipment receives an indication of whether the network cell it is attempting to camp on is a small cell or macro cell. The indication may be a system information block flag or cell identifier, a system information block from a macro cell restricting camping on certain small cells, a master information block having a flag to indicate whether camping is permitted, a time or frequency location for a synchronization signal, among other indications.

The process then proceeds to block 820 in which a check is made to determine whether the cell the UE is attempting to camp on is a small cell or a large cell. In some cases, the check at block 820 may also determine whether or not camping should be allowed on a small cell. For example, in some cases a macro cell may allow camping on certain small cells but not others.

If the check at block 820 determines that the network cell is a small cell that should not be camped on the process proceeds to block 822 in which camping on the cell is restricted. The process then proceeds to block 830 and ends.

Conversely, if the check at block 820 determines that the network cell can be camped on then the process proceeds to block 824 in which camping is allowed on the network cell. The process then proceeds to block 830 and ends.

Assisted Serving Cell Addition/Removal Procedures

In another aspect of the present embodiments, when the UE changes from idle mode to connected mode, for example through downlink paging or uplink data arrival, since the UE always camps on the macro cell, the UE will initiate the random access to the macro cell and establish an RRC connection with the macro cell.

After the RRC connection is established with the macro cell, the macro cell may configure the UE with the inter-frequency measurements on the small cell frequencies to measure the surrounding small cells.

In one embodiment, the macro cell may choose not to make this measurement configuration if the macro cell intends to keep the UE only in the macro cell. For example, the loading of the macro cell may be quite low and macro cell may decide that the UE can be handled at the macro cell. Other reasons for keeping the UE on the macro cell would be apparent having regard to the present disclosure.

When the UE is configured with inter-frequency measurements to measure small cells, including measurement gaps and measurement periods, the UE may then start to measure the RSRP/RSRQ of the surrounding small cells. The measurements may, for example, be in a high frequency band when the small cells are in the high frequency band and the macro is in the lower frequency band.

In one alternative, to further save a battery power on the UE, the network may configure the UE to start the inter-frequency measurements only when it knows the UE has moved closer to the small cells.

In one embodiment, the network may also notify the UEs of the small cell identifiers and other information for the small cells in order to save UE processing effort.

Once the small cells are detected, they may be added as assisted servicing cells. Further, once the signal from the small cell diminished below a certain threshold, the small cell may be removed as an assisted serving cell.

Figure 9:
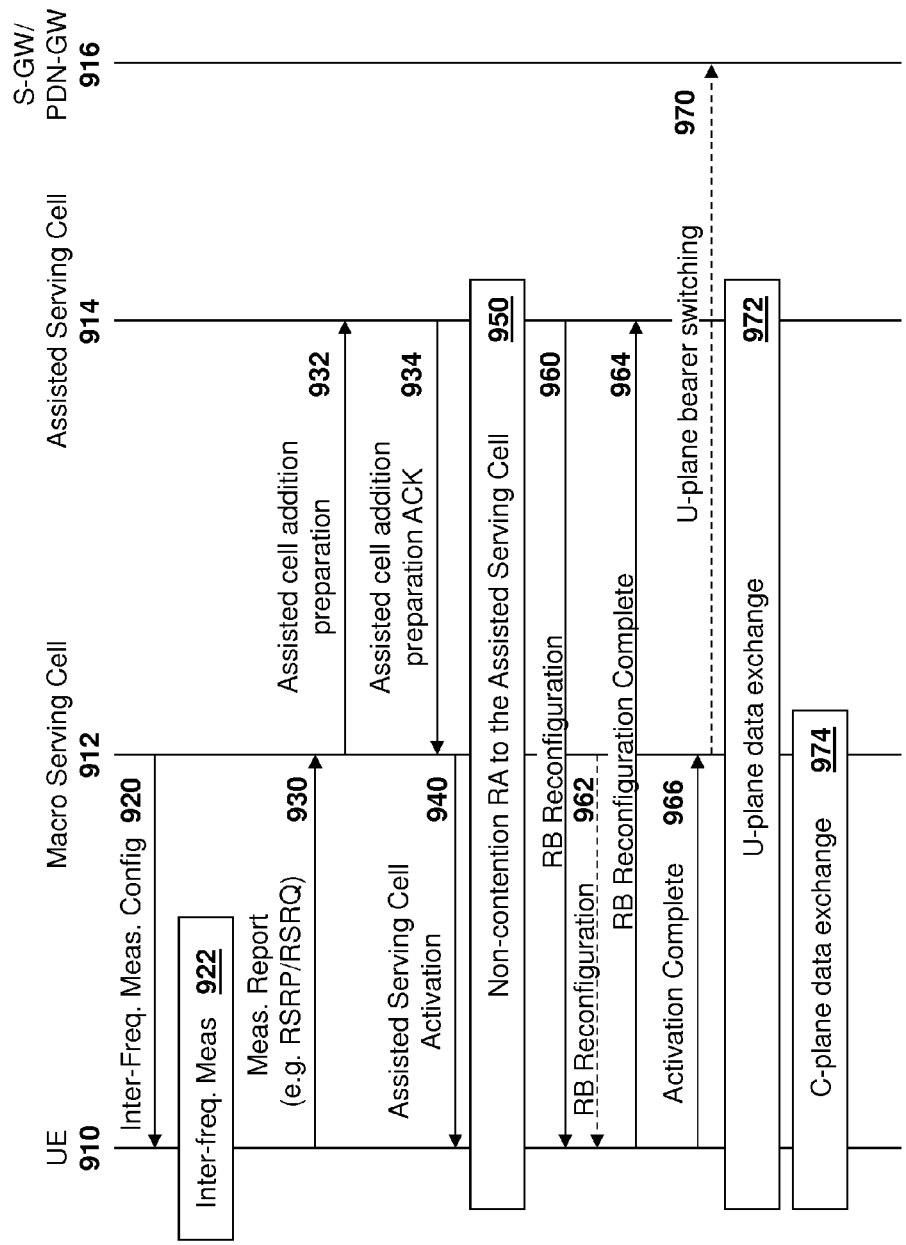
FIG. 9 is a data flow diagram showing an example assisted serving cell addition procedure.

Reference is now made to FIG. 9, which shows an example flow diagram for assisted serving cell addition.

In FIG. 9, a UE 910 communicates with a macro serving cell 912.

Macro serving cell 912 signals to UE 910 that an inter-frequency measurement is required, as shown with inter-frequency measurement configuration message 920.

After receiving message 920, UE 910 then performs inter-frequency measurements. This may include for example measuring small cells, and the measurement is shown by block 922 in the embodiment of FIG. 9. In one embodiment the UE detects a cell 914 that may become an assisted serving cell.

UE 910 then signals a measurement report including, for example, the RSRP/RSRQ measurements back to the macro serving cell 912, as shown with message 930. Based on the reported RSRP/RSRQ results, the macro cell could add one or more small cells into the assisted serving cell list. For simplicity, it is assumed with the example of FIG. 9 that only one assisted serving cell 914 is added.

Macro serving cell 912 then sends an assisted serving cell addition preparation message 932 to assisted serving cell 914 and in response receives an assisted cell addition preparation acknowledgement message 934. In one embodiment, the assisted cell addition preparation acknowledgement message 934 could include radio bearer reconfiguration information.

The macro serving cell 912 may also convey the sequence number status of the packet transmission to the assisted serving cell 914 and perform data forwarding to the assisted serving cell 914.

The macro serving cell 912 may then signal UE 910 to add the assisted serving cell into its active cell list. This could be done with an assisted serving cell activation RRC signaling message 940 sent to UE 910.

Message 920 may include the dedicated preamble and the cell-radio network temporary identifier (C-RNTI) for the target small cell 914 in some cases. After receiving the message, the UE 910 may perform a non-contention based random access to get uplink timing alignment with the assisted target cell to establish a communication link. Non-contentious radio access is shown by block 950 in the embodiment of FIG. 9.

In one embodiment, in order to enhance the connection set up procedure, during random access procedure with the assisted serving cell, the assisted serving cell 914 may direct data radio bearers, but not signaling radio bearers, to UE 910, as shown by message 960.

In an alternative embodiment, as shown by message 962, the radio bearer reconfiguration may be sent by macro serving cell 912 to UE 910 instead. Such information may, for example, be received at macro serving cell 912 from assisted serving cell 914 using message 934 over a backhaul such as an X2 interface. In one embodiment, the radio bearer reconfiguration may be sent by macro serving cell 912 to UE 910 using message 940.

Once the radio bearer reconfiguration is received at UE 910, the UE may then send a radio bearer reconfiguration complete message 964 to the assisted serving cell 914 and may further indicate that activation is complete to macro serving cell 912, as shown by message 966.

Once the macro serving cell 912 receives an activation complete message 966, it may switch the user plane radio bearers from macro serving cell 912 to the assisted serving cell 914 through a message to a serving gateway (S-GW)/packet data node gateway (PDN-GW) 916, as shown by message 970.

After this, the user plane data is exchanged between assisted serving cell 914 and the UE 910, as shown by block 972. The control plane data is exchanged between macro serving cell 912 and UE 910, as shown by block 974.

In one alternative embodiment, in the assisted serving cell activation RRC signaling, radio bearer configurations of small cells may be directly included so that the random access procedure with the small cell is mainly for uplink timing alignment purposes. Thus, after the radio bearers are set up with the small cells, data communication could start.

Figure 10:
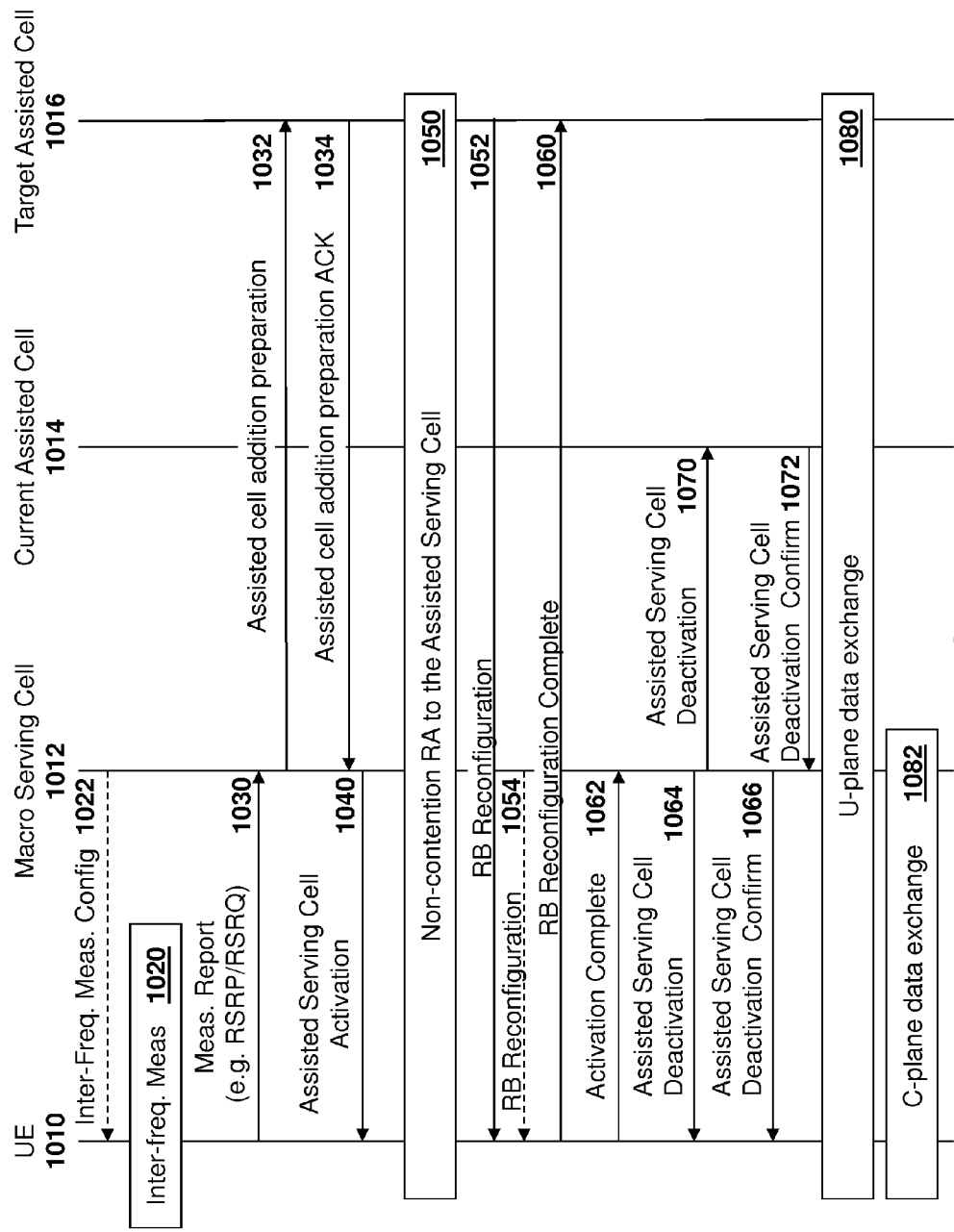
FIG. 10 is a data flow diagram showing an example assisted serving cell activation and deactivation due to user equipment mobility.

In some cases, the assisted serving cell may need to be switched and reference is now made to FIG. 10 which shows an assisted serving cell removal procedure.

As seen in FIG. 10, a UE 1010 communicates with a macro serving cell 1012. Further, a current assisted cell 1014 provides user plane data to the UE 1010.

UE 1010 makes inter-frequency measurements for small cells, as shown by block 1020. This may be based on receiving an inter-frequency measurement configuration message 1022, but may also be based on the UE making periodic inter-frequency measurements.

UE 1010 then sends a measurement report with the RSRP/RSRQ, for example, to macro serving cell 1012, as shown by message 1030. The message 1030 may indicate that the UE is moving out of coverage assisted serving cell 1014. Message 1030 may also include RSRP/RSRQ values of different small cells.

The macro eNB 1012 may then send an assisted serving cell modification RRC signaling message to the UE, as shown by message 1040. Message 1040 may remove the current assisted serving cell and add a new assisted serving cell. Further, macro serving cell 1012 may send an assisted serving cell addition preparation message to a target assisted cell 1016, as shown by message 1032 and the macro serving cell 1012 may receive an acknowledgement or confirmation message 1034 back. The current assisted cell 1014 may send the sequence number status of the packet transmission to the macro serving cell 1012 first and the macro serving cell 1012 further sends the sequence number status to the target assisted cell 1016. For data forwarding, the current assisted cell 1014 may first forward the data to the macro serving cell 1012 and then the macro serving cell 1012 further forwards the data to the target assisted cell 1016. Alternatively, the sequence number status transfer and data forwarding could be performed directly between the current assisted cell 1014 and the target assisted cell 1016.

UE 1010 may then attempt a random access procedure with the new target assisted serving cell 1016, shown by block 1050.

Further data radio bearers could then be set up with the new assisted target serving cell 1016. This may be based on a radio bearer reconfiguration message 1052 received from target assisted cell 1016 or a similar message 1054 received from macro serving cell 1012. The radio bearer reconfiguration of message 1054 may be received at macro serving cell 1012 over a backhaul interface such as an X2 interface and may, for example, be provided within message 1034.

Once the radio bearer reconfiguration is complete, a message 1060 may be sent from UE 1010 to target assisted cell 1016.

UE 1010 will then provide an activation complete message 1062 to macro serving cell 1012.

Macro serving cell 1012 will then send an assisted serving cell deactivation message indicating that the UE should remove the current assisted cell 1014. The message is shown with arrow 1064 in the embodiment of FIG. 10.

In response to the receipt of message 1064, the UE 1010 will send message 1066 back to macro serving cell 1012 confirming the deactivation.

Further, the macro cell 1012 will send an assisted serving cell deactivation to current assisted cell 1014, as shown by message 1070 and a confirmation may be sent back as shown by arrow 1072.

Upon the deactivation of the current assisted cell 1014 and the activation of target assisted cell 1016, user plane data may be exchanged between UE 1010 and target assisted cell 1016, as shown by block 1080. Further, control plane data exchange may occur between the UE 1010 and macro serving cell 1012 as shown by block 1082.

In an alternative embodiment, the random access procedure to the new assisted serving cell may be skipped if the coverage sizes of the current and the new assisted serving cells are similar and the coverage sizes of the assisted serving cells are small. In this case, the uplink timing is similar for both small cells since there is similar path loss.

In some embodiments, the macro cell may know both small cells have similar uplink timing and in this case the random access may not be needed. This could reduce the switch delay on the user plane in some embodiments.

In the embodiment of FIG. 10, the assisted serving cell activation or deactivation is due to UE mobility. In this case, the target assisted serving cell could be added either before or after the current assisted serving cell is removed. Further, in the embodiment of FIG. 10, the target assisted cell is shown to be added first and the current assisted cell is then deactivated. However, in other embodiments these could be reversed.

In some cases, there may not be any other suitable small cells available for transfer and in this case, the macro serving cell may keep the UE for both the user plane and the control plane communications. In this case, the macro serving cell may signal to the serving gateway to switch the user plane to the macro serving cell until a subsequent time where it may choose to add a new assisted serving cell or re-add a previous assisted serving cell.

Enhanced DRX Procedures

In a further embodiment of the present disclosure, the macro cell may configure a small cell specific DRX to limit the small cell PDCCH monitoring activities. In accordance with one embodiment, the UE may have two different DRX configurations that are active simultaneously. One of the DRX configurations is the macro-cell DRX configuration which controls macro-cell PDCCH monitoring activity. The other DRX configuration is the small-cell DRX configuration which controls the small-cell PDCCH monitoring activity.

In one example, the two DRX configurations could complement each other in order to make UEs only monitor one cell at any given subframe.

In another example, the two configurations could overlap so at certain subframes the UE may need to monitor both PDCCHs. Both configurations could be achieved by suitable configurations of the DRX parameters such as the on-duration timer, inactivity timer, DRX cycle length, among others.

The two DRX operations may cooperate to further save battery resources on the UE. For example, after a period of inactivity the UE may only monitor the macro cell and, if necessary, the macro cell may send initial PDCCH data for the small cell transmission and subsequently the UE may then monitor the small cell.

When active on the small cell, the UE could return the function for the macro cell sending the PDCCH for the UE to get control data.

Figure 11:
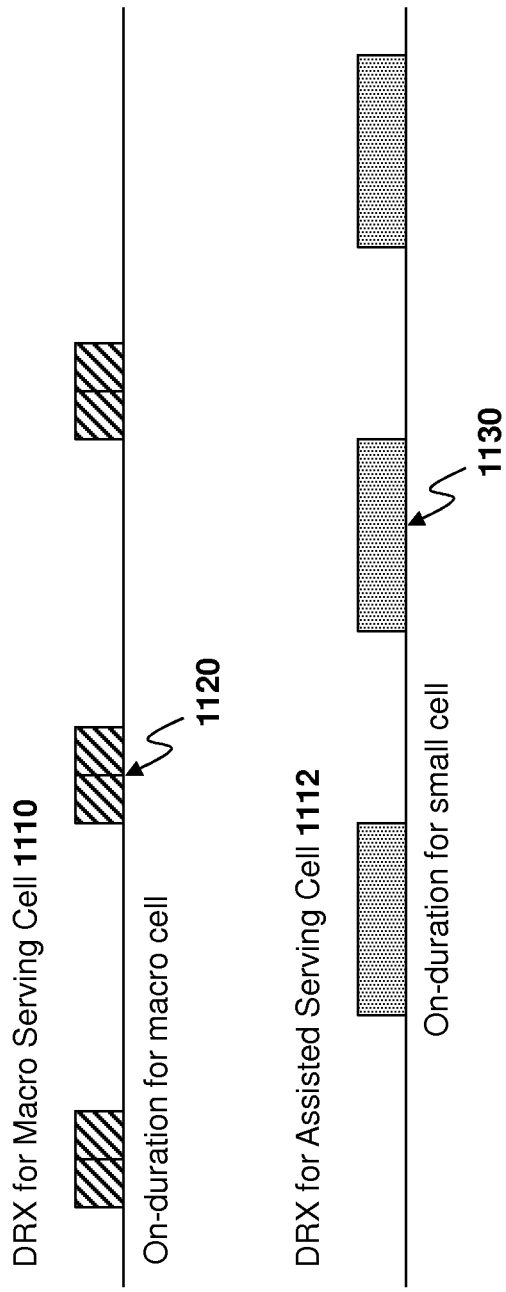
FIG. 11 is a block diagram showing discontinuous reception configurations for a macro cell and assisted serving cell.

Reference is now made to FIG. 11, which shows an example of multiple non-overlapping DRX configurations.

As seen in FIG. 11, a first DRX configuration for macro serving cell 1110 compliments a second DRX configuration for assisted serving cell 1112. In particular, the on duration for the DRX for macro cell is shown with arrow 1120 and the on duration for the small cell is shown with arrow 1130. In this case, the on duration for the macro cell 1120 does not overlap with the on duration for the small cells 1130.

For cell measurements, the UE may continue to measure the RSRP/RSRQ of cells on both frequency bands. In other words, UE may continue to monitor the macro cell band and the small cell band. No measurement gaps and measurement periods are needed to perform such measurements, since both bands are "intra-frequencies" to the UE.

In one alternative, the control serving cell may reconfigure the measurement entities and events when a small cell becomes an assisted serving cell for the UE. Thus, in one example, the macro cell will remove the inter-frequency measurement entities and events, but add or modify the intra-frequency measurement entities and events for the UE, even though the small cell is on a different frequency band.

Enhancements to Layer 1 Channels and Uplink Timing Alignments

In a further, alternative embodiment, operation for both UEs and the network may be simplified through the use of independent layer 1 control channels or data channels for each serving cell.

Macro Cell

With regard to macro cell layer 1 channels, on the downlink of the macro cell, the UE needs to monitor the PDCCH if DRX is not configured. However, since the macro serving cell may only provide control plane data communication such as mobility control information, there may be infrequent data exchange between the macro cell and the UE. In this case, a macro cell specific DRX could be applied to reduce the UE battery consumption by avoiding double decoding of the PDCCH from both the macro cell and the small cell. Therefore, in this case the UE only monitors the macro cell PDCCH during the active time. Further, the macro cell specific DRX long cycles could be relatively large.

After decoding the PDCCH, the UE could receive the corresponding physical downlink shared channel (PDSCH) from the macro cell. The UE may also receive the PCFICH and the physical HARQ indicator channel (PHICH) from the macro cell.

On the uplink of the macro cell, the UE needs to report the channel quality indicator (CQI)/precoding matrix indicator (PMI)/rank indicator (RI)/precoding type indicator (PTI) to the macro cell. The reporting may be done periodically or aperiodically. However, due to infrequent transmissions, aperiodical CQI/PMI/RI/PTI transmissions may be more suitable in some embodiments.

To further improve spectrum efficiency, in a further embodiment higher layer signaling, including RRC signaling, may be used to deliver the CQI/PMI/RI/PTI rather than the layer 1 control signalling.

In a further embodiment, if the UE is closer to the small cell, which has the smaller pathloss, in some instances the UE may transmit the physical uplink shared channel (PUSCH) for the macro serving cell through the assisted serving cell. That is, for the data that the UE intends to transmit to the macro serving cell, the UE may transmit to the assisted serving cell and the assisted serving cell may relay the data to the macro serving cell. In this case, data tunneling may be needed using a backhaul interface such as an X2 interface for the transmission of such data from the assisted serving cell to the macro serving cell.

Figure 12:
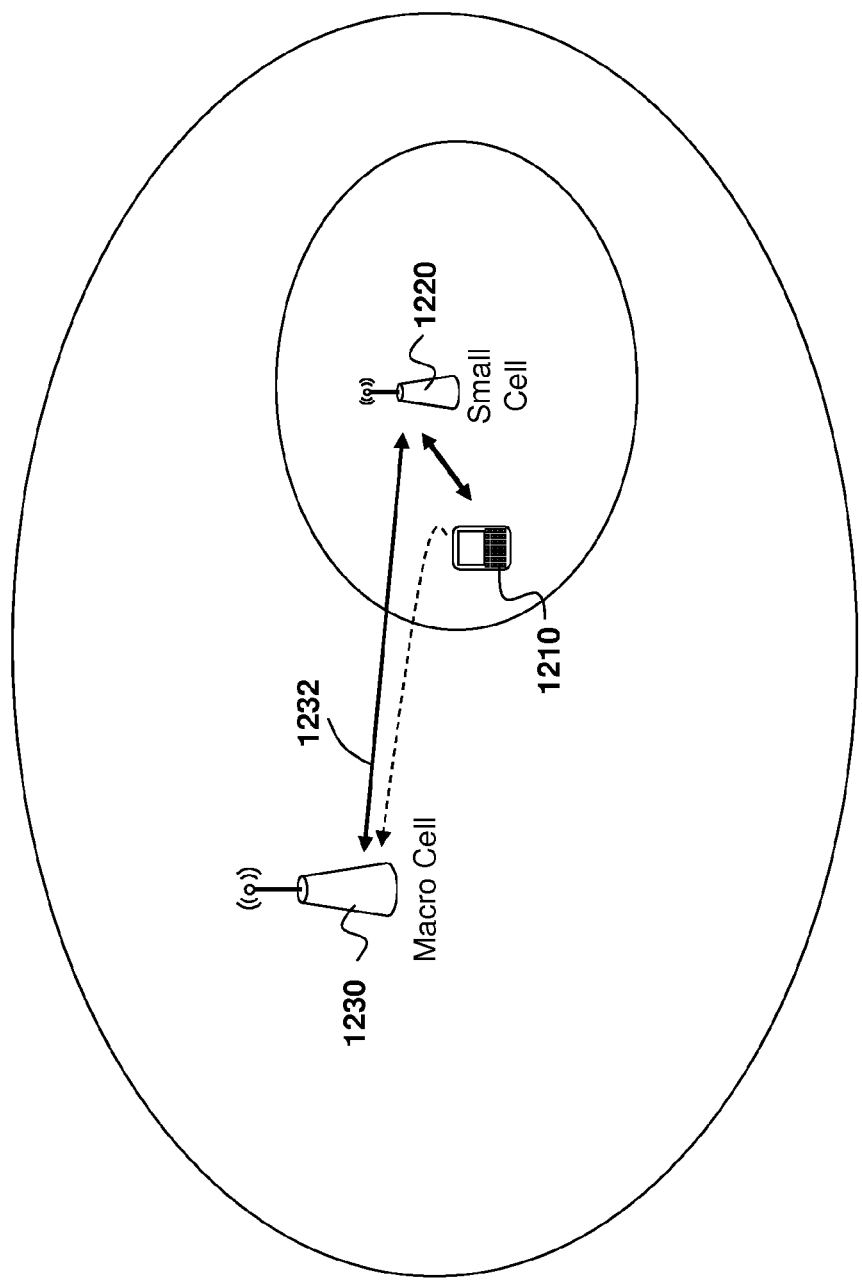
FIG. 12 is a block diagram showing an example of signaling for a macro cell flowing through a small cell.

Reference is now made to FIG. 12, which shows the reporting of data to the macro cell utilizing the small cell. In particular, in FIG. 12, a UE 1210 communicates with a small cell 1220. Further, the UE 1210 needs to provide information or data to macro cell 1230. In this case, UE 1210 sends the information or data to small cell 1220 which, through a backhaul interface shown by link 1232 then sends the data to macro cell 1230. Thus, in FIG. 12, for the data that the UE needs to transmit to the macro cell, including measurement reports, the UE may first transmit to the small cell and the small cell may then transmit to the macro cell.

In a further embodiment, the relayed data may include layer 1 control signalling that the UE intends to transmit to the macro cell when a fast backhaul between the macro cell and the small cell is available.

With regard to the embodiments above, since the small cell communicates on a different frequency than the macro cell, no information will be received by the macro cell directly, but only through the backhaul X2 interface.

Assisted Serving Cell

With regard to the assisted serving cell, enhancements may also be made to the assisted serving cell layer 1 channels. On the downlink of the assisted serving cell, the UE may monitor the PDCCH of the assisted serving cell for downlink or uplink grants and other control information. The present embodiments provide for several enhancements over current PDCCH data received from the assisted serving cell.

In one embodiment, the PDCCH from the assisted serving cell may be carried in the PDSCH region of the small cell. In this case, the macro-serving cell may signal the resources to be used for the PDSCH region to deliver the downlink control information (DCI) which may include the number of resource blocks, the location of the resource blocks, the number of orthogonal frequency division multiplexing (OFDM) symbols, the start of the OFDM symbol index, the reference symbol (RS) configurations for the control region among others.

In a further embodiment, the DCI information of the assisted serving cell may be carried by the PDCCH from the macro serving cell. In this case, the assisted serving cell may determine the resource grant and modulation coding scheme (MCS) information. This information may be delivered to the macro serving cell through the X2 interface for the downlink transmission. In this case, the UE does not need to monitor two PDCCHs and only needs to monitor the PDCCH from the macro-serving cell. However, sufficient PDCCH regions need to be configured on the macro-serving cell to prevent control channel bottlenecks.

Further, the assisted serving cell may not need to provide the PDCCH which can simplify the operation of the assisted serving cell, which then only provides the PDSCH. However, in this case, the backhaul delay between the two serving cells may need to be small in order for the information to be exchanged efficiently.

However, even with low latency backhaul, the PDCCH grants for PDSCH transmissions are typically in the same subframe. Therefore, in one embodiment, when the PDCCH grant is received in subframe N from the macro serving cell, the actual PDSCH grant may be for another subframe, referred to as N+K. For example, K might equal 4 where the grant is four subframes in the future on the assisted serving cell.

Figure 13:
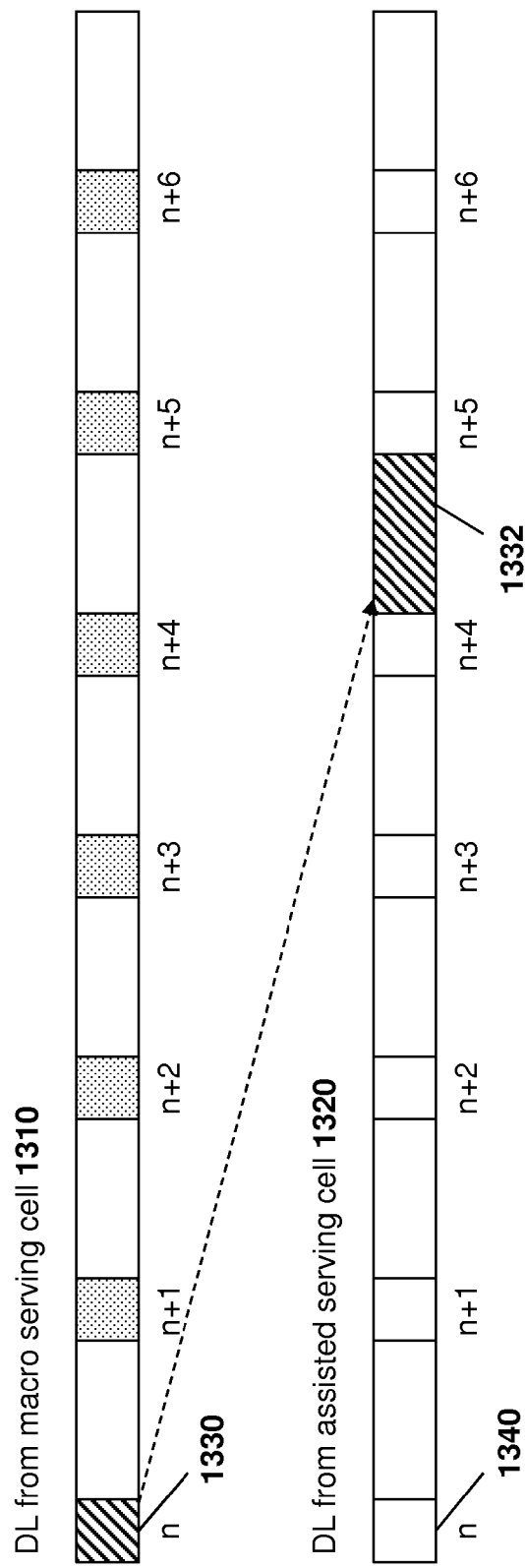
FIG. 13 is a block diagram showing an example of delayed physical downlink shared channel transmissions using cross carrier scheduling.

Reference is now made to FIG. 13, which shows a downlink channel from a macro serving cell 1310 and the downlink channel from an assisted serving cell 1320. In a subframe n on the macro serving cell 1310, shown with reference numeral 1330, a PDCCH for the assisted serving cell is provided. In this case, the relevant PDSCH is shown with reference numeral 1332 and is for four subframes in the future from the PDCCH subframe.

In one embodiment, a flag may be used in the PDCCH from the macro cell to indicate that the grant is for the assisted serving cell. In some embodiments the grant may also need to include identification of the assisted serving cell, for example when there are multiple configured assisted serving cells.

In a further embodiment, the assisted serving cell may not need to transmit the PCFICH, but a PHICH may still be needed.

In a further embodiment the PHICH may also not be needed and in this case adaptive retransmissions in the uplink of the assisted serving cells will always apply. In other words, non-adaptive uplink retransmissions would not exist in this case. Hence, all layer 1 downlink control channels could be removed from the assisted serving cell.

Referring again to FIG. 13, if the downlink control channels are removed, then the control regions 1340 may also be removed from the assisted serving cell 1320. The control regions 1340 could then be replaced by the PDSCH, allowing more data throughput.

On the uplink of the assisted serving cell, layer 1 control channels may still be needed including ACK/NACK transmissions. Other transmissions that may be needed on the uplink include the CQI/PMI/RI/PTI transmissions and scheduling request (SR) transmissions. The use of the uplink control channels on layer 1 may allow for more efficient use of battery resources on the UE since there is a smaller path loss to the UE from the small cell than from the large cell in some cases.

Uplink Timing Alignment

For uplink timing alignment, the UE may need to maintain two different uplink transmission timings. One timing alignment may be needed for the macro serving cell and the other timing alignment needed for the assisted serving cell. Two different timing alignment timers (TAT) may be needed and maintained separately. The macro serving cell will periodically send a timing advance (TA) command to the UE to maintain the uplink timing alignment and the same may be sent for the assisted serving cell.

If uplink timing is lost on any one of the links, the UE may need to start the random access procedure to re-synchronize the uplink.

In one embodiment of the present disclosure, only PDCCH order based random access may be supported on the assisted serving cell. Thus, if the uplink timing is lost in the assisted serving cell, and there is downlink data arrival, the assisted serving cell could send the PDCCH order to the UE to trigger uplink synchronization for data exchange.

If there is uplink data arrival at the UE, the UE could first indicate to the macro serving cell through a SR transmission and/or a buffer status report (BSR) transmission, and then the macro serving cell could notify the assisted serving cell to trigger the PDCCH order for the uplink synchronization with the assisted serving cell. Data exchange would still occur with the assisted serving cell.

Figure 14:
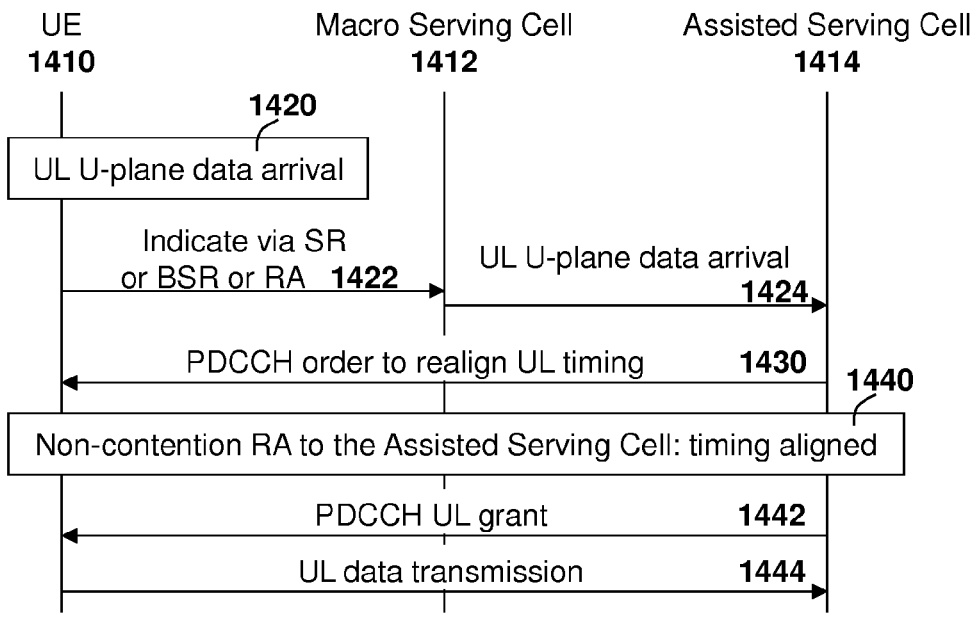
FIG. 14 is an example data flow diagram showing uplink timing alignment with a small cell.

Reference is now made to FIG. 14, which shows an example for re-establishing uplink timing with an assisted serving cell. As seen in FIG. 14, a UE 1410 communicates both with the macro serving cell 1412 and an assisted serving cell 1414.

On the UE 1410, uplink data arrives, as shown by block 1420. In this case, the UE 1410 provides a message 1422 to macro serving cell 1412. Message 1422 indicates to macro serving cell 1412, through either the SR, BSR or random access (RA), that uplink user plane data has arrived. Macro serving cell 1412 then sends an uplink user plane data arrival message 1424 to the assisted serving cell 1414. In one embodiment, the indication at block 1422 may indicate which assisted serving cell the uplink data is for, and provide an identifier for the serving cell if there are multiple assisted serving cells.

Once the assisted serving cell 1414 has received the uplink user plane data at message 1424, the assisted serving cell 1414 then sends a PDCCH order to realign uplink timing. The message is sent to UE 1410 and is shown by arrow 1430.

Based on the receipt of message 1430, the UE 1410 may then perform non-contentious random access to the assisted serving cell in order to re-align timing, as shown by block 1440.

Once the timing is re-aligned, the assisted serving cell 1414 may send a PDCCH uplink grant message 1442 and the UE may then provide the uplink data transmission as shown by message 1444.

In an alternative embodiment, a UE initiated random access may also be supported in the assisted small cell. In this case, if there is an uplink data arrival, the UE could indicate to the assisted serving cell through UE initiated contention based random access procedures and uplink timing could also be achieved. The assisted serving cell could then transmit the uplink grant and the UE could perform uplink data transmission accordingly.

Figure 15:
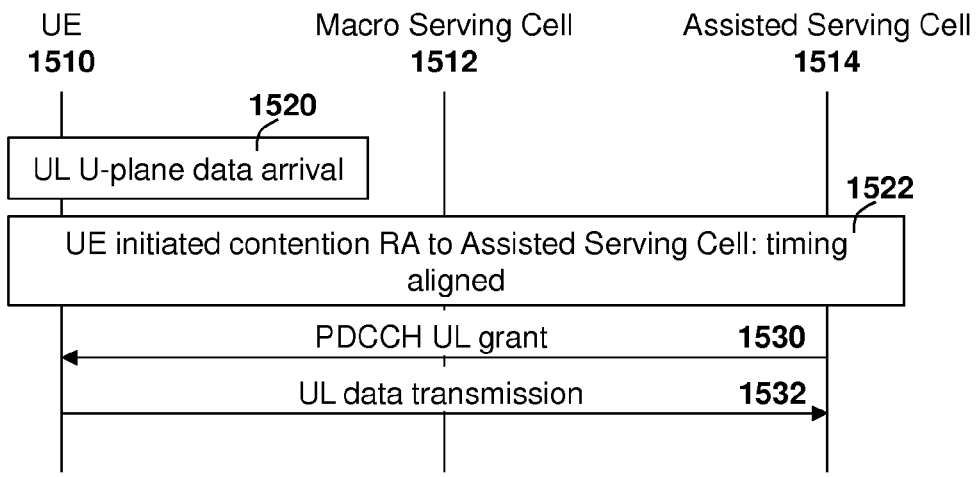
FIG. 15 is an example data flow diagram showing uplink timing alignment using user equipment initiated random access in an assisted cell.

Reference is now made to FIG. 15. In the embodiment of FIG. 15 a UE 1510 communicates with both a macro serving cell 1512 and an assisted serving cell 1514.

At UE 1510, uplink user plane data arrives, as shown by block 1520, and the UE then initiates a contention based random access to the assisted serving cell 1514, as shown by block 1522.

Based on the contention based RA, the assisted serving cell 1514 then sends a PDCCH uplink grant message 1530 and the UE may then send uplink data transmission messages, as shown by arrow 1532.

Assisted Serving Cell Layer 2 Architecture and Transport Channels

In one embodiment, when small cells have an S1 interface, the small cell is visible to the network and has its own cell identifier. The small cell will transmit the PSS/SSS/MIB/SIB and can operate like a regular cell. In this case, the UE may receive RRC messages from both the assisted serving cell and the macro serving cell.

In accordance with one embodiment, in order to reduce UE complexity, the UE may have only one RRC connection with the macro serving cell. RRC related information of the assisted serving cell will be first delivered to the macro serving cell and then the macro serving cell may transmit to the UE through the signaling radio bearer.

If the small cell does not have an S1 interface, the small cell may not have its own cell identifier and may not transmit the PSS/SSS. There are therefore no RRC functions in the small cell and the small cell operates like a user plane relay point for the macro cell. In this case, a layer 2 only assisted serving cell architecture is provided below. A new entity, referred to herein as a local RRC (LRRC) is provided to facilitate layer 2 only assisted serving cell operations.

In particular, when the small is visible to the UE and has its own cell identifier, in the RRC layer the macro serving cell controls the mobility related functions such as handover functions, measurement functions, assisted serving cell activation/deactivation functions, macro-serving cell DRX functions, radio bearer configurations for the macro serving cell, among others. The small cell controls local radio resource management functions such as data radio bearer configurations, assisted serving cell DRX configurations, among others. The RRC of the small cells will not have the mobility control functions, measurements related functions and paging functions in this case.

Assisted Serving Cell with S1 Interface

Figure 16:
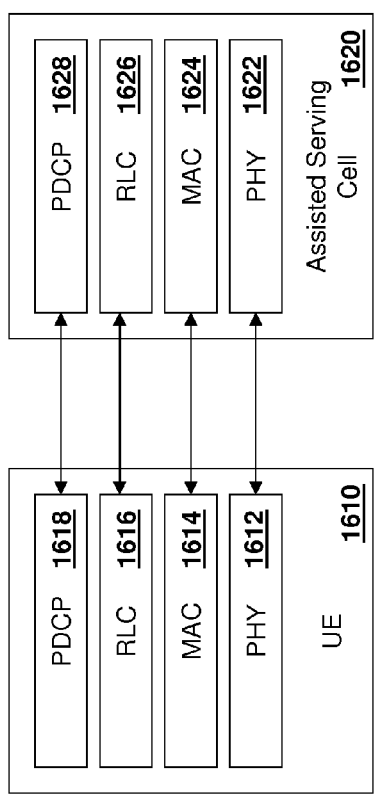
FIG. 16 is an example user plane protocol stack between a UE and an assisted serving cell.

Reference is now made to FIG. 16. As seen in FIG. 16, the assisted serving cell has a full user plane protocol stack. In particular, a UE 1610 has various protocol stack layers including a physical layer 1612, a medium access control (MAC) layer 1614, a radio link control (RLC) layer 1616 and a packet data convergence protocol (PDCP) layer 1618.

Similarly, assisted serving cell 1620 includes a protocol stack with a physical layer 1622, a MAC layer 1624, an RLC layer 1626 and a PDCP layer 1528.

As seen in the embodiment of FIG. 16, logically the communications occur between the same protocol layers between UE 1610 and assisted serving cell 1620.

Figure 17:
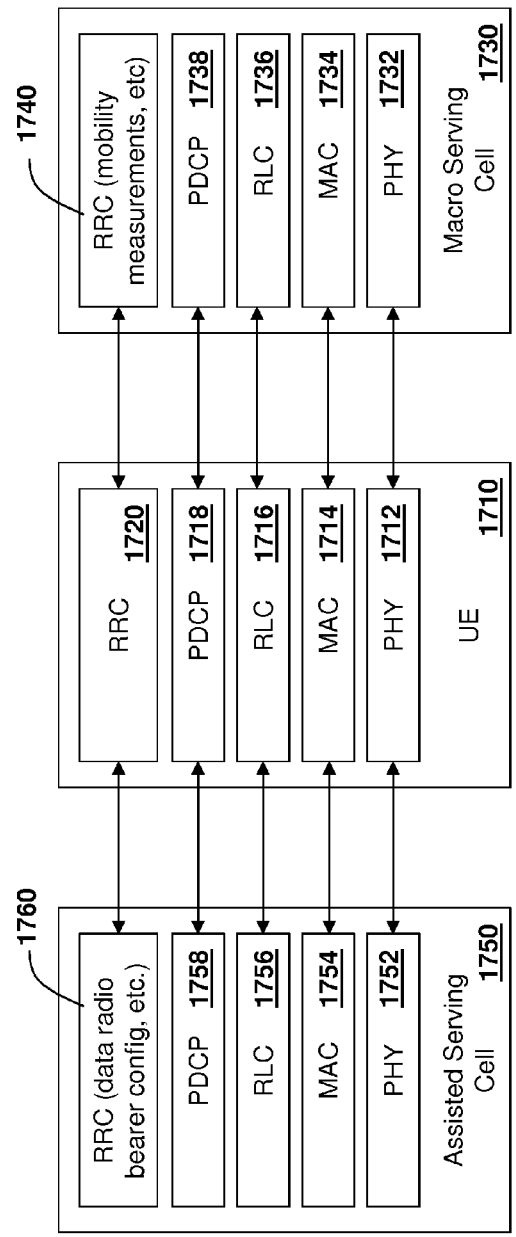
FIG. 17 is an example control plane protocol stack between a UE, a macro cell and an assisted serving cell.

Reference is now made to FIG. 17. When the assisted serving cell has an S1 interface with a mobility management entity (MME), the control plane for the assisted serving cell may be as shown with regard to FIG. 17. In particular, UE 1710 includes a physical layer 1712, a MAC layer 1714, an RLC layer 1716, a PDCP layer 1718, and an RRC layer 1720.

Macro serving cell 1730 includes a physical layer 1732, a MAC layer 1734, an RLC layer 1736, a PDCP layer 1738 and a RRC layer 1740. RRC layer 1740 is used, in the example of FIG. 17, for mobility management, handover functions, assisted serving cell activation/deactivation functions, macro serving cell DRX functions, radio bearer configurations for the macro serving cell, among other functionality.

Similarly, assisted serving cell 1750 includes a physical layer 1752, a MAC layer 1754, an RLC layer 1756, a PDCP layer 1758 and an RRC layer 1760. RRC layer 1760 may be used for data radio bearer configuration, assisted serving cell DRX configurations, among other functionality.

Thus, as seen in FIG. 17, in the control plane a UE is receiving RRC messages from both the assisted serving cell 1750 and the macro serving cell 1730. Such RRC communications can cause UE complexity.

In order to reduce UE complexity, in one embodiment of the present disclosure, the UE has only one RRC connection with the macro serving cell. RRC related information of the assisted serving cell is first delivered to the macro serving cell through the S1 interface and then the macro serving cell may transmit the RRC information to the UE through the signaling radio bearer. In one embodiment, certain RRC "containers" may be designed to deliver the RRC related information of the assisted serving cell.

Figure 18:
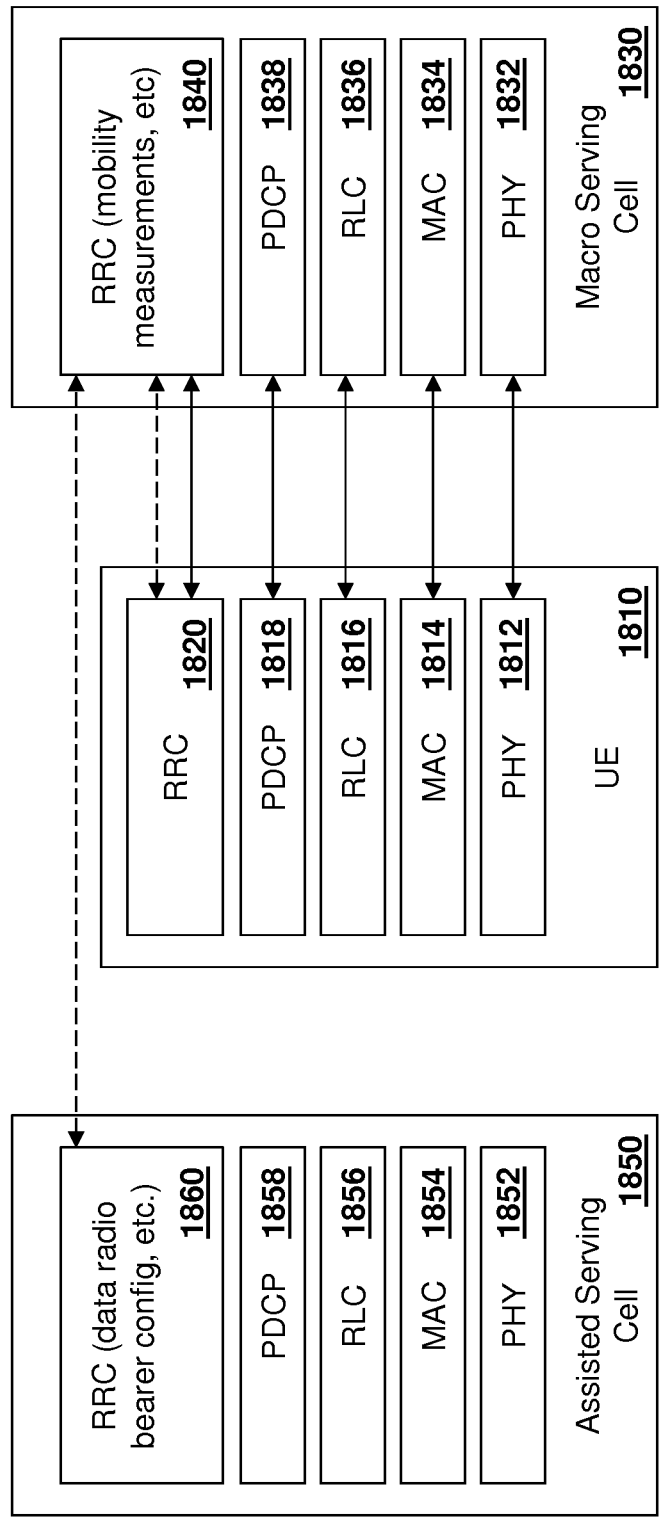
FIG. 18 is a further example control plane protocol stack between a UE, a macro cell and an assisted serving cell.

Reference is now made to FIG. 18, which shows an alternative control plane to that of FIG. 17. The embodiment of FIG. 18 includes a UE 1810 having a physical layer 1812, a MAC layer 1814, an RLC layer 1816, a PDCP 1818 and an RRC layer 1820.

A macro serving cell 1830 includes a physical layer 1832, a MAC layer 1834, an RLC layer 1836, a PDCP layer 1838, and an RRC layer 1840. The RRC layer 1840 is used for the same purposes as RRC layer 1740 of the embodiment of FIG. 17.

Similarly, assisted serving cell 1850 includes a physical layer 1852, a MAC layer 1854, an RLC layer 1856, a PDCP layer 1858, and an RRC layer 1860. The RRC layer 1860 has the same functionality as the RRC layer 1760 in the embodiment of FIG. 17.

However, contrary to the embodiment of FIG. 17, the embodiment of FIG. 18 has the RRC layer 1860 of the assisted serving cell 1850 communicating with RRC layer 1840 of macro serving cell 1830. Such communication may be, for example, through a backhaul between the macro serving cell 1830 and assisted serving cell 1850.

The RRC layer 1840 then communicates with the RRC layer 1820 of UE 1810.

Assisted Serving Cell without S1 Interface

In a further embodiment, the assisted serving cell may not have an S1 interface with an MME. If there is no S1 interface, there are no RRC functions on the small cell and the small cell operates like a U-plane relay point for the macro cell.

Figure 19:
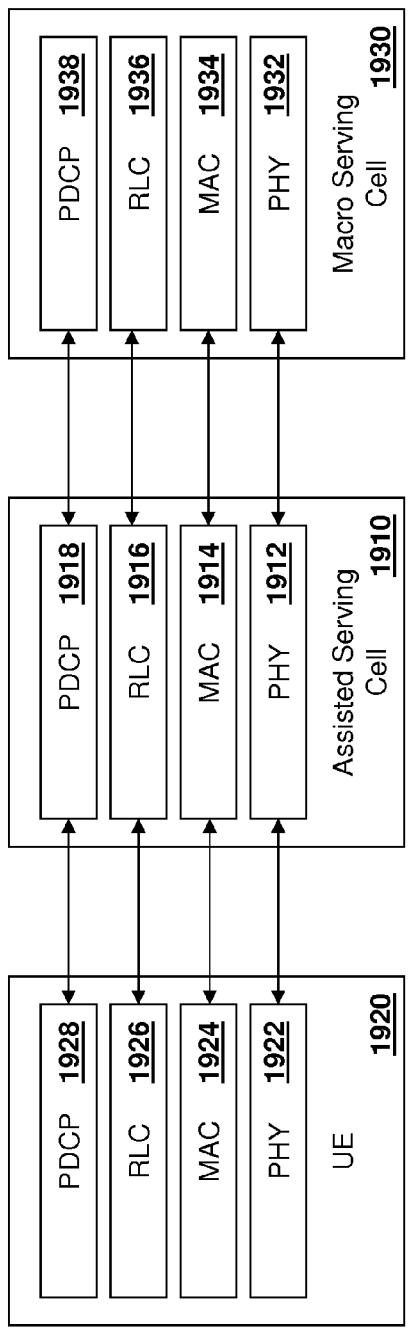
FIG. 19 is an example user plane protocol stack between a UE and an assisted serving cell where the assisted serving cell has no S1 interface.

Reference is now made to FIG. 19, which shows the user plane for an assisted serving cell without an S1 interface. As seen in FIG. 19, assisted serving cell 1910 includes a physical layer 1912, MAC layer 1914, RLC layer 1916 and PDCP layer 1918.

Similarly, UE 1920 includes a physical layer 1922, a MAC layer 1924, an RLC layer 1926 and a PDCP layer 1928.

Macro serving cell 1930 includes a physical layer 1932, a MAC layer 1934, an RLC layer 1936 and a PDCP layer 1938.

In the embodiment of FIG. 19, the assisted serving cell 1910 provides a relay between the macro serving cell 1930 and the UE 1920. Thus, in the embodiment of FIG. 19, the macro serving cell delivers the PDCP service data unit (SDU) for all users that utilize the assisted serving cell 1910. In the assisted serving cell, a full user plane stack is available for data transmission. Each user has its own PCDP SDU queues for both uplink and downlink.

Figure 20:
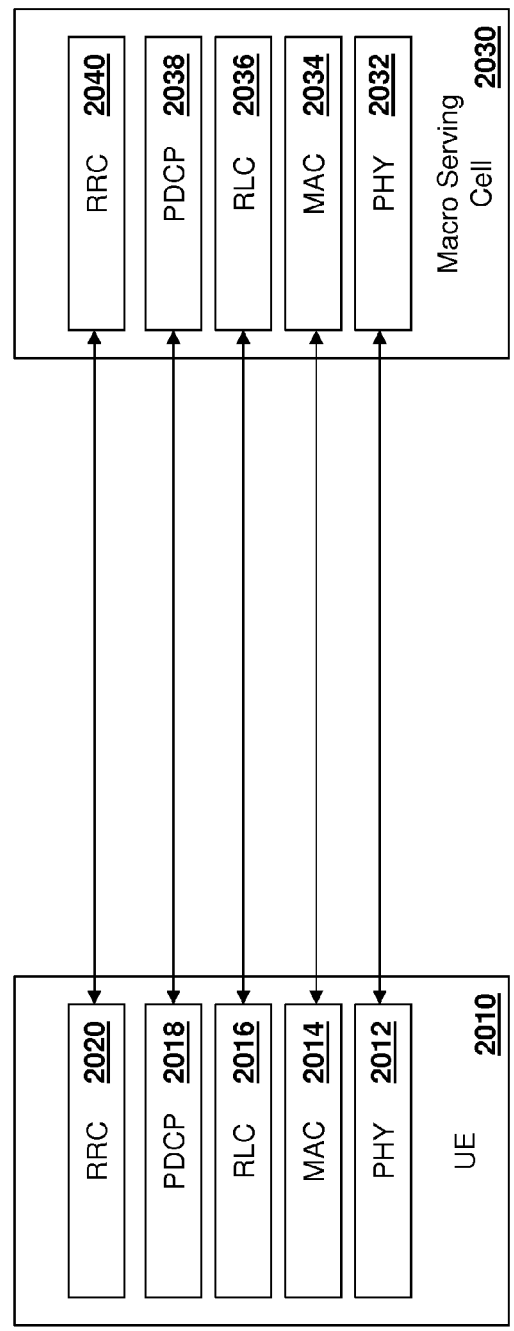
FIG. 20 is an example control plane protocol stack between a UE and a macro cell where an assisted serving cell has no S1 interface.

Referring to FIG. 20, the figure shows the control plane when the assisted serving cell has no S1 interface. A UE 2010 communicates with the macro serving cell 2030. UE 2010 includes a physical layer 2012, a MAC layer 2014, an RLC layer 2016, a PDCP layer 2018 and an RRC layer 2020. Similarly, macro serving cell 2030 includes a physical layer 2032, a MAC layer 2034, an RLC layer 2036, PDCP layer 2038 and an RRC layer 2040.

Since the assisted serving cell has no S1 connection, the macro serving cell 2030 handles all RRC related functions, including mobility, radio bearer configuration, DRX configuration, measurement configuration, paging functionalities, among others. The assisted serving cell does not have an RRC connection to the UE 2010.

Figure 21:
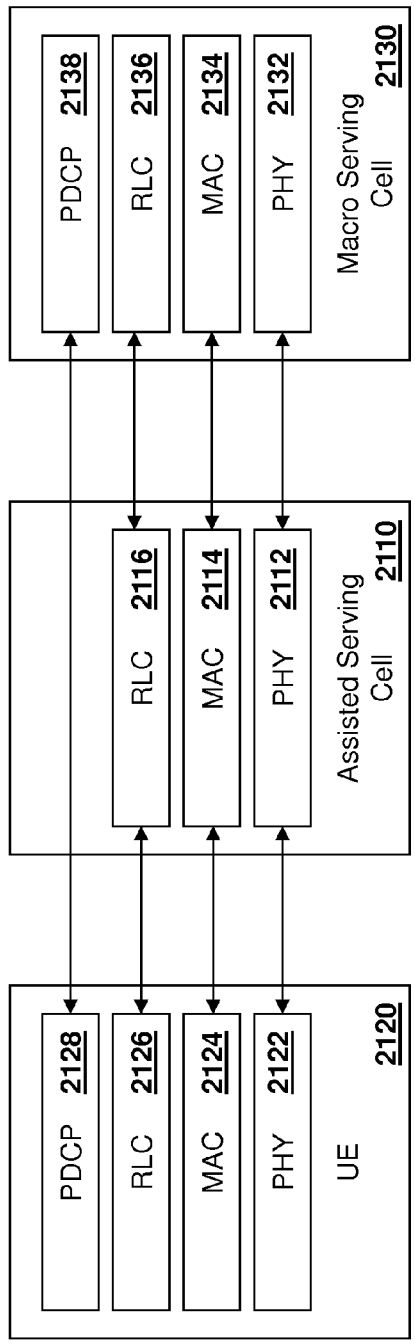
FIG. 21 is an example user plane protocol stack between a UE, an assisted serving cell and a macro cell, where the assisted serving cell has no PDCP layer.

In a further embodiment, a layer 2 only assisted serving cell is provided. In this case, the MAC layer function may be implemented in the small cell. The scheduling function and HARQ function are also in the small cell, as is the random access function. Further, the full RLC function is provided in the assisted serving cell. However, in this embodiment, the PDCP function is not found within the small cell. In this case, macro-serving cell delivers the PDCP protocol data unit (PDU) to the assisted serving cell and all ciphering and integrity protection are done in the macro serving cell. The macro-serving cell configures all RRC related configurations in the assisted serving cell through an X2 interface. Reference is now made to FIG. 21.

FIG. 21 shows a user plane protocol stack between the UE, assisted serving cell and macro serving cell. In the embodiment of FIG. 21, assisted serving cell 2110 includes a physical layer 2112, a MAC layer 2114 and an RLC layer 2116. A UE 2120 includes a physical layer 2122, a MAC layer 2124, an RLC layer 2126 and a PDCP layer 2128.

Similarly, macro serving cell 2130 includes a physical layer 2132, a MAC Layer 2134, a RLC layer 2136 and a PDCP layer 2138.

Thus, in accordance with the embodiment of FIG. 21, the PDCP layer 2138 of the macro serving cell 2130 communicates directly with PDCP layer 2128 of the UE 2120 and the assisted serving cell 2110 does not include a PDCP layer.

For the control plane, the control plane is identical in the embodiment as that of FIG. 20 above.

With the above embodiment, some limited RRC functionality may still be needed at the small cell for radio management purposes. Thus, in a further embodiment, a local radio resource control (LRRC) may be implemented in the small cell.

Figure 22:
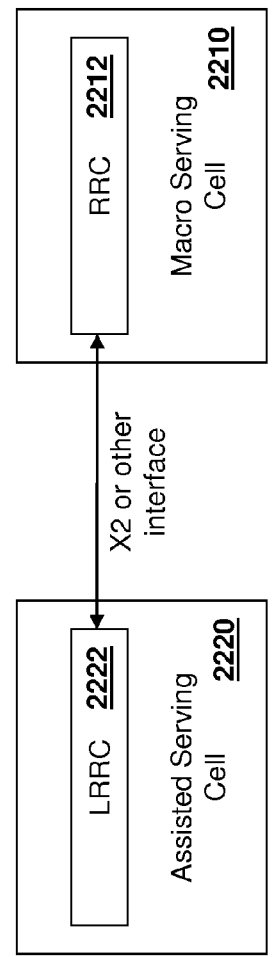
FIG. 22 is an example local radio resource control protocol between a macro cell and a layer 2 assisted serving cell having no S1 interface.

Reference is now made to FIG. 22, where a macro serving cell 2210 has an RRC layer 2212. In this case, a macro serving cell 2210 may configure the LRRC layer 2222 of assisted serving cell 2220 over an X2 interface. In some cases a low latency backhaul link may be used for such configuration, especially with some situations with fast radio configurations.

An LRRC layer 2222 may have a number of functionalities. These may include, but are not limited to, the following:
Random Access function for assisted serving cell
Radio bearer configurations (e.g., data radio bearers) for assisted serving cell according to the instructions from the macro-serving cells.
Report the resource/traffic status to the eNB such as the number of RB used
Uplink timing alignment for the camped UEs
Generating the uplink timing offset values from the layer 1 provided estimation
Configuring the MAC to transmit the TA Command
Maintain the list of the UE IDs that utilizes the assisted serving cell.

Thus in accordance with the above, the assisted cell has a radio resource control that provides certain functionality to UEs on an assisted serving cell without an S1 interface.

Collaborated HARQ

For hybrid automatic repeat request, one straightforward solution would be to have two completely independent HARQ procedures, one for the link between the macro cell and the UE and the second for the link between the small cell and the UE. In this way, each link is operated separately and the HARQ procedures are relatively straightforward. However, the maintaining of two completely independent HARQ procedures may increase control overhead and reduce the battery life of a UE.

To overcome the above, HARQ may be implemented in a hybrid fashion. Specifically, on the link between the macro cell and the UE, the data transmission is infrequent and is mostly composed of control plane data. Thus, in accordance with one embodiment of the present disclosure, synchronous HARQ is applied in the downlink, meaning the HARQ process identifier is implicitly mapped to the subframe number for the specific UE. Those skilled in the art will appreciate that the synchronous behavior is only applied to some UEs, and other UEs may still use asynchronous HARQ procedures, meaning that the HARQ process IDs are not mapped with the subframe number implicitly.

In order to simplify changes within the LTE specifications, the DCI format may not be changed, even though for synchronous HARQ, the HARQ process ID is not needed to be transmitted. Alternatively, the HARQ process ID in the DCI formats for a UE that is configured with synchronous downlink HARQ processes may be removed.

Figure 23:
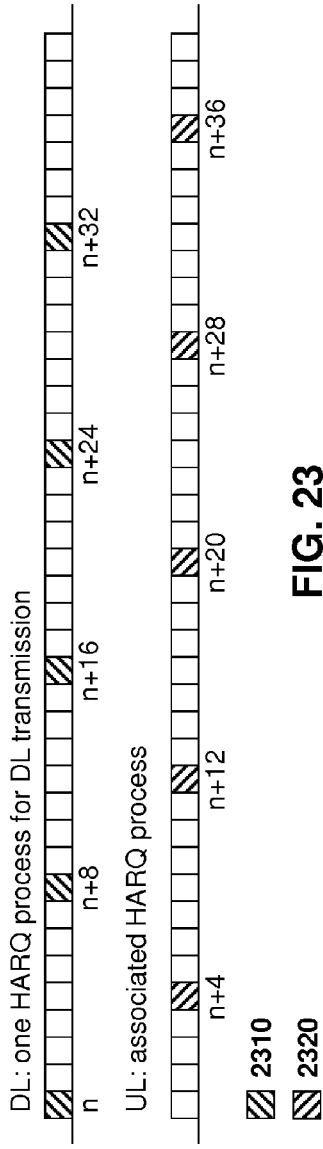
FIG. 23 is an example block diagram of downlink/uplink HARQ signaling between a macro cell and a UE.

For a UE that is configured with DL synchronous HARQ process, only one or two HARQ processes are reserved for the communication. Reference is now made to FIG. 23 in which one HARQ process is used in the example. Specifically, as seen in FIG. 23, for the downlink there is only one reserved HARQ slot every 8 subframes, as shown by reference numeral 2310. This is however meant to be an example and other configurations for reserved downlink subframes are possible.

There is also an associated uplink HARQ process where a reserve slot is associated with the downlink DL HARQ slot 2310. The uplink slot is shown by reference numeral 2320. In the example of FIG. 23, the associated uplink HARQ process is 4 ms apart from the downlink process in a frequency division duplex (FDD) system.

Thus, in accordance with the example of FIG. 23, the UE may only receive subframes n, n+8, n+16, n+24, etc. The UE may be active in the associated uplink HARQ process, at subframes n+4, n+12, n+20, etc.

The downlink transmission only occurs in the allocated HARQ process. In other words, the eNB only transmits data to the UE every 8 subframes. The UE will be in sleep mode during other HARQ processes. For example, the UE wakes up at subframe "n" and blindly decodes its PDCCH from the macro cell. If there is data for the UE, the UE will receive the data in the PDSCH and then 4 ms later in the UL subframe n+4 the UE will feedback its ACK/NACK to the macro cell.

The macro cell may schedule the UE in subframe n+8 for the retransmission if a NACK is received.

Conversely, if an ACK is received, the macro cell could schedule new data to the UE.

In current embodiments of LTE, in a given subframe the UE may only receive one UE-specific PDSCH transmission. However, due to the limited time slots in which the UE could receive PDSCH transmissions in accordance with the above, in one embodiment the UE may further receive more than one UE-specific PDSCH transmission in one subframe.

Thus, for example, in subframe n+8, the UE may receive both the grant for the retransmission and the grant for the new data transmission. This could potentially reduce the data transmission delay. In another example, the UE may receive multiple grants for the new data transmission.

Due to the multiple PDSCH transmissions to a UE in a subframe, additional uplink ACK/NACK resources may be needed. If there are two PDSCH transmissions with each having one codeword, then a PUCCH format 1b may be used with each ACK/NACK bit corresponding to one PDSCH transmission. If more than two ACK/NACK bits are needed then PUCCH format 1b with channel selection or PUCCH format 3 could be used.

The uplink transmission only occurs in the associated uplink HARQ process. In other words, the UE only transmits the data to the macro cell every 8 subframes but with a 4 subframe offset from the downlink HARQ process in FDD mode. Note in TDD mode, the offset should be K and K may dynamically change according to different TDD configurations. For example, if the UE has data to send in the uplink and indicates to the macro cell by either the random access, the SR channel or BSR, the macro cell transmits the UL grant in the PDCCH region of subframe n. The UE then transmits its data in the uplink subframe n+4. In the downlink subframe n+8, in the case of non-adaptive transmission, the UE will wake up to receive the ACK/NACK from the macro cell to determine whether the data is received or not and perform the corresponding non-adaptive retransmissions on the uplink subframe n+12. In the case of adaptive retransmissions, the UE receives a retransmission grant and performs the retransmission in the uplink subframe n+12.

In a further embodiment, the PCFICH and/or the PHICH may not be needed for the macro cell. Specifically, if most of the traffic from the macro cell is control plane data and therefore does not have not have bursty characteristics, dynamic adaptation of the PDCCH region at a subframe level may not be necessary. The present disclosure provides that the PDCCH of the macro cell may be pre-configured or semi-statically configured through SIB signalling or RRC dedicated signalling.

The macro cell may signal a UE, indicating whether the downlink synchronous HARQ is configured. If configured, the macro cell needs to further signal to the UE about the number of HARQ processes to be used for the downlink and the details of the HARQ processes such as the HARQ process IDs.

In one alternative, the associated uplink HARQ process could also be implicitly derived from the downlink HARQ process.

In the time division duplex (TDD) case, a mapping table of the downlink/uplink HARQ process may be pre-determined in the standards or the macro cell may signal to the UE that the downlink subframes that the UE needs to monitor.

If transmissions of the macro cell system information are not in the downlink subframes that the UE needs to monitor, dedicated RRC signalling can be used to deliver the system information to the UE.

Figure 24:
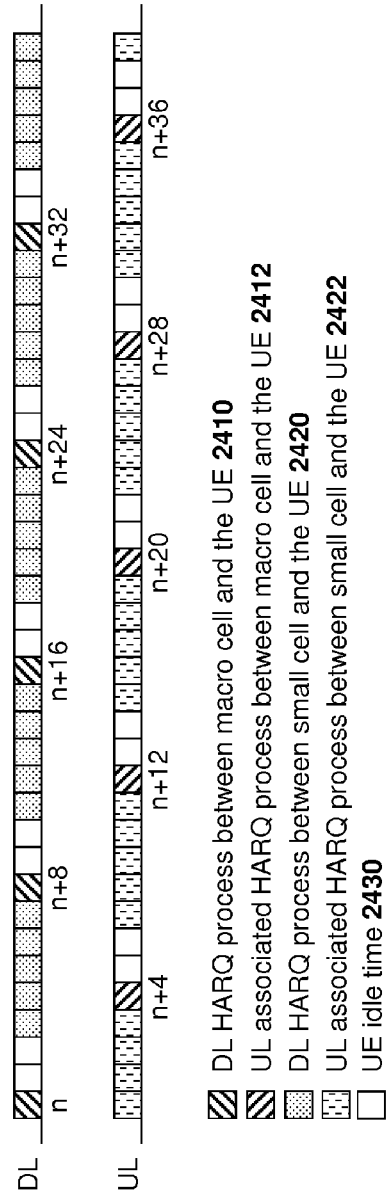
FIG. 24 is an example block diagram showing synchronous operations and HARQ process assignments between a macro cell, UE and a small cell.

On the link between the small cell and the UE, user-plane data is exchanged. Due to the large amount of data and bursty characteristics of this data, asynchronous HARQ may be a suitable choice while the uplink could provide for a synchronous HARQ. In an alternative embodiment, similar synchronous HARQ may be applied to the downlink as well and the macro cell may signal to the UE the number of HARQ processes used for the link between the small cell and the UE. Reference is now made to FIG. 24.

As seen in FIG. 24, the UE will receive or transmit data to the macro cell on one allocated HARQ process, as shown by reference numeral 2410 in the downlink and by reference numeral 2412 in the uplink.

For the small cell, the UE will receive or transmit data to the small cell in 5 allocated HARQ processes in the example of FIG. 24. The exchange of data with the small cell is shown with reference numeral 2420 in the downlink and reference numeral 2422 in the uplink.

Idle frames are shown with reference numeral 2430.

The above example of FIG. 24 assumes that the macro cell and small cell operate in a synchronous manner. In the example of FIG. 24, in a given subframe the UE will receive or transmit data from or to only one cell. In other words, in a given subframe the UE will receive on one frequency. This may simplify the UE implementation as well as saving UE battery power.

For unallocated HARQ processes, the UE could go to an idle radio state, thereby saving the battery resources.

When the UE needs to receive system information, the UE may receive the system information regardless of the HARQ process allocation. In another alternative, the macro cell may include the system information transmission during the allocated HARQ process, for example, via dedicated control signaling.

The macro cell signals the HARQ process allocation to the UE for both the macro cell and the small cell. The allocation could be semi-statically updated from time to time based on traffic conditions. In one extreme case, the macro cell may allocate no HARQ processes between the small cell and the UE, which means that there is no user plane data communication on the link. The HARQ process allocation could overlap or be non-overlapped in some embodiments.

The macro cells and small cells or assisted serving cells may be implemented using any network element. A simplified network element is shown with regard to FIG. 25.

Figure 25:
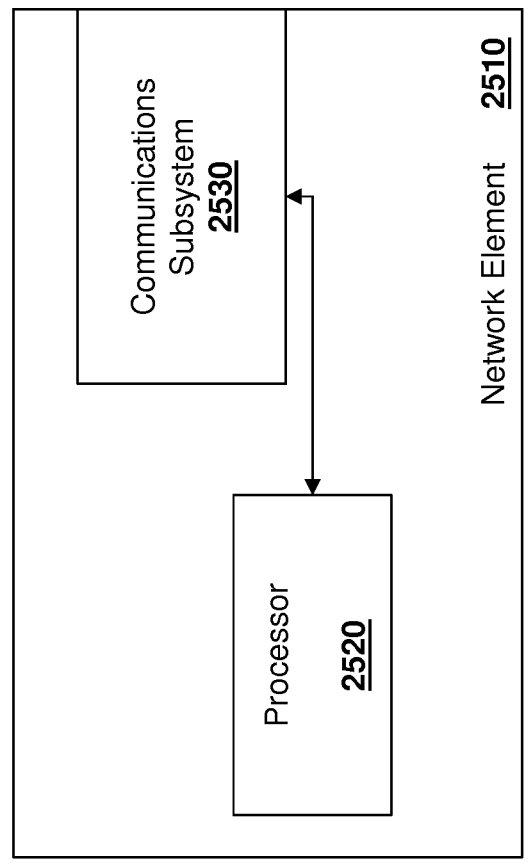
FIG. 25 is a simplified block diagram of an example network element.

In FIG. 25, network element 2510 includes a processor 2520 and a communications subsystem 2530, where the processor 2520 and communications subsystem 2530 cooperate to perform the methods described above.

Further, the above may be implemented by any UE. One exemplary device is described below with regard to FIG. 26.

UE 2600 is typically a two-way wireless communication device having voice and data communication capabilities. UE 2600 generally has the capability to communicate with other computer systems. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 2600 is enabled for two-way communication, it may incorporate a communication subsystem 2611, including both a receiver 2612 and a transmitter 2614, as well as associated components such as one or more antenna elements 2616 and 2618, local oscillators (LOs) 2613, and a processing module such as a digital signal processor (DSP) 2620. As will be apparent to those skilled in the field of communications, the particular design of the communication subsystem 2611 will be dependent upon the communication network in which the device is intended to operate. The radio frequency front end of communication subsystem 2611 can be any of the embodiments described above.

Network access requirements will also vary depending upon the type of network 2619. In some networks network access is associated with a subscriber or user of UE 2600. A UE may require a removable user identity module (RUIM) or a subscriber identity module (SIM) card in order to operate on a network. The SIM/RUIM interface 2644 is normally similar to a card-slot into which a SIM/RUIM card can be inserted and ejected. The SIM/RUIM card can have memory and hold many key configurations 2651, and other information 2653 such as identification, and subscriber related information.

Figure 26:
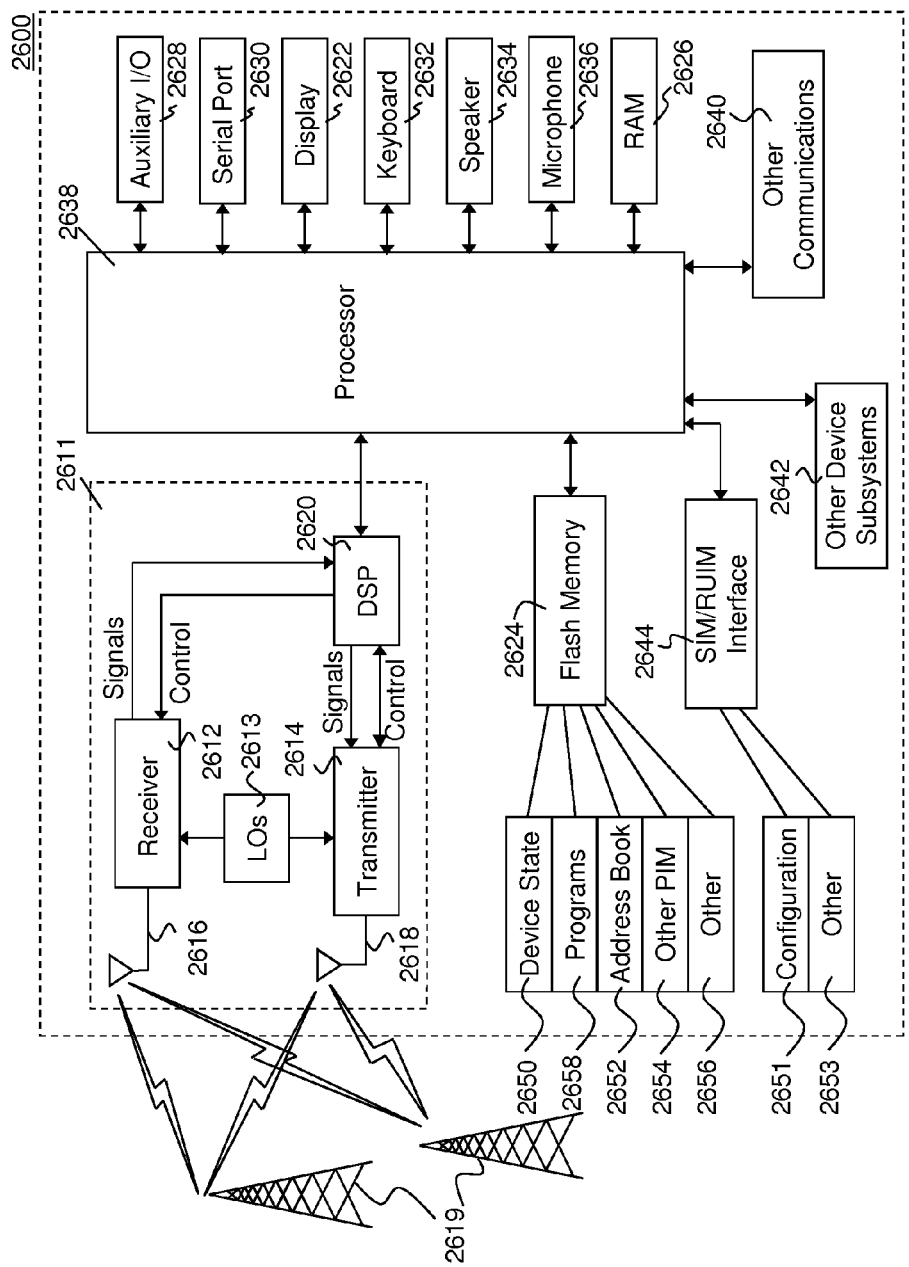
FIG. 26 is a block diagram of an example user equipment.

When required network registration or activation procedures have been completed, UE 2600 may send and receive communication signals over the network 2619. As illustrated in FIG. 26, network 2619 can consist of multiple base stations communicating with the UE. These can include base stations for macro cells and assisted serving cells or small cells in accordance with the embodiments described above.

Signals received by antenna 2616 through communication network 2619 are input to receiver 2612, which may perform such common receiver functions as signal amplification, frequency down conversion, filtering, channel selection and the like. A/D conversion of a received signal allows more complex communication functions such as demodulation and decoding to be performed in the DSP 2620. In a similar manner, signals to be transmitted are processed, including modulation and encoding for example, by DSP 2620 and input to transmitter 2614 for digital to analog conversion, frequency up conversion, filtering, amplification and transmission over the communication network 2619 via antenna 2618. DSP 2620 not only processes communication signals, but also provides for receiver and transmitter control. For example, the gains applied to communication signals in receiver 2612 and transmitter 2614 may be adaptively controlled through automatic gain control algorithms implemented in DSP 2620.

UE 2600 generally includes a processor 2638 which controls the overall operation of the device. Communication functions, including data and voice communications, are performed through communication subsystem 2611. Processor 2638 also interacts with further device subsystems such as the display 2622, flash memory 2624, random access memory (RAM) 2626, auxiliary input/output (I/O) subsystems 2628, serial port 2630, one or more keyboards or keypads 2632, speaker 2634, microphone 2636, other communication subsystem 2640 such as a short-range communications subsystem and any other device subsystems generally designated as 2642. Serial port 2630 could include a USB port or other port known to those in the art.

Some of the subsystems shown in FIG. 26 perform communication-related functions, whereas other subsystems may provide "resident" or on-device functions. Notably, some subsystems, such as keyboard 2632 and display 2622, for example, may be used for both communication-related functions, such as entering a text message for transmission over a communication network, and device-resident functions such as a calculator or task list.

Operating system software used by the processor 2638 may be stored in a persistent store such as flash memory 2624, which may instead be a read-only memory (ROM) or similar storage element (not shown). Those skilled in the art will appreciate that the operating system, specific device applications, or parts thereof, may be temporarily loaded into a volatile memory such as RAM 2626. Received communication signals may also be stored in RAM 2626.

As shown, flash memory 2624 can be segregated into different areas for both computer programs 2658 and program data storage 2650, 2652, 2654 and 2656. These different storage types indicate that each program can allocate a portion of flash memory 2624 for their own data storage requirements. Processor 2638, in addition to its operating system functions, may enable execution of software applications on the UE. A predetermined set of applications that control basic operations, including at least data and voice communication applications for example, will normally be installed on UE 2600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 2619. Further applications may also be loaded onto the UE 2600 through the network 2619, an auxiliary I/O subsystem 2628, serial port 2630, short-range communications subsystem 2640 or any other suitable subsystem 2642, and installed by a user in the RAM 2626 or a non-volatile store (not shown) for execution by the processor 2638. Such flexibility in application installation increases the functionality of the device and may provide enhanced on-device functions, communication-related functions, or both. For example, secure communication applications may enable electronic commerce functions and other such financial transactions to be performed using the UE 2600.

In a data communication mode, a received signal such as a text message or web page download will be processed by the communication subsystem 2611 and input to the processor 2638, which may further process the received signal for output to the display 2622, or alternatively to an auxiliary I/O device 2628.

A user of UE 2600 may also compose data items such as email messages for example, using the keyboard 2632, which may be a complete alphanumeric keyboard or telephone-type keypad, among others, in conjunction with the display 2622 and possibly an auxiliary I/O device 2628. Such composed items may then be transmitted over a communication network through the communication subsystem 2611.

For voice communications, overall operation of UE 2600 is similar, except that received signals would typically be output to a speaker 2634 and signals for transmission would be generated by a microphone 2636. Alternative voice or audio I/O subsystems, such as a voice message recording subsystem, may also be implemented on UE 2600. Although voice or audio signal output is generally accomplished primarily through the speaker 2634, display 2622 may also be used to provide an indication of the identity of a calling party, the duration of a voice call, or other voice call related information for example.

Serial port 2630 in FIG. 26 would normally be implemented in a personal digital assistant (PDA)-type UE for which synchronization with a user's desktop computer (not shown) may be desirable, but is an optional device component. Such a port 2630 would enable a user to set preferences through an external device or software application and would extend the capabilities of UE 2600 by providing for information or software downloads to UE 2600 other than through a wireless communication network. The alternate download path may for example be used to load an encryption key onto the device through a direct and thus reliable and trusted connection to thereby enable secure device communication. As will be appreciated by those skilled in the art, serial port 2630 can further be used to connect the UE to a computer to act as a modem.

Other communications subsystems 2640, such as a short-range communications subsystem, is a further optional component which may provide for communication between UE 2600 and different systems or devices, which need not necessarily be similar devices. For example, the subsystem 2640 may include an infrared device and associated circuits and components or a Bluetooth™ communication module to provide for communication with similarly enabled systems and devices. Subsystem 2640 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment operating in a network having a macro cell and at least one assisted serving cell, the method comprising:
   receiving downlink data from the macro cell on a predetermined number of hybrid automatic repeat request (HARQ) downlink processes;
   sending uplink data to the macro cell on HARQ uplink processes associated with the downlink macro cell HARQ processes;
   receiving downlink data from the assisted serving cell on a second predetermined number of hybrid automatic repeat request (HARQ) downlink processes; and
   sending uplink data to the assisted serving cell on HARQ uplink processes associated with the downlink assisted serving cell HARQ processes,
   wherein the user equipment is served by both the macro cell and the at least one assisted serving cell.

2. The method of claim 1,
   wherein the receiving downlink data from the macro cell comprises using synchronous HARQ between the user equipment and the macro cell.

3. The method of claim 1, wherein no data is received from the macro cell in other subframes than subframes associated with the predetermined number of HARQ downlink processes.

4. The method of claim 1, comprising sending an acknowledgement or negative acknowledgement a predetermined number of subframes after the receiving.

5. The method of claim 4, wherein, if a negative acknowledgement is sent, retransmission is not received until a next subframe associated with the HARQ process.

6. The method of claim 1, wherein grants for both retransmission and a new data transmission are received from the macro cell in a same subframe for the user equipment.

7. The method of claim 1, wherein multiple grants for new data transmission are received from the macro cell in a same subframe for the user equipment.

8. The method of claim 7, wherein uplink acknowledgement and negative acknowledgements use a physical uplink control channel format 1b.

9. The method of claim 7, wherein uplink acknowledgement and negative acknowledgements use a physical uplink control channel format 3.

10. The method of claim 1, further comprising receiving signaling from the macro cell confirming whether synchronous HARQ is to be used.

11. The method of claim 10, further comprising receiving an indication of the predetermined number of HARQ processes.

12. The method of claim 1, wherein a mapping table of downlink and uplink HARQ processes is signaled to the user equipment for a time division duplex network.

13. The method of claim 12, wherein the signaling uses radio resource control signaling.

14. The method of claim 12, wherein the signaling uses MAC control signaling.

15. The method of claim 1, further comprising using asynchronous HARQ between the user equipment and the at least one assisted serving cell.

16. A user equipment operating in a network having a macro cell and at least one assisted serving cell, the user equipment comprising:
   a processor; and
   a communications subsystem, wherein the user equipment is configured to:
   receive downlink data from the macro cell on a predetermined number of hybrid automatic repeat request (HARQ) downlink processes;
   send uplink data to the macro cell on HARQ uplink processes associated with the downlink macro cell HARQ processes;
   receive downlink data from the assisted serving cell on a second predetermined number of hybrid automatic repeat request (HARQ) downlink processes; and
   send uplink data to the assisted serving cell on HARQ uplink processes associated with the downlink assisted serving cell HARQ processes,
   wherein the user equipment is served by both the macro cell and the at least one assisted serving cell.

17. The user equipment of claim 16, wherein
   the receiving downlink data from the macro cell comprises using synchronous HARQ between the user equipment and the macro cell.

18. The user equipment of claim 16, wherein no data is received from the macro cell in other subframes than subframes associated with the predetermined number of HARQ downlink processes.

19. The user equipment of claim 16, comprising sending an acknowledgement or negative acknowledgement a predetermined number of subframes after the receiving.

20. The user equipment of claim 19, wherein, if a negative acknowledgement is sent, retransmission is not received until a next subframe associated with the HARQ process.

21. The user equipment of claim 16, wherein grants for both retransmission and a new data transmission are received from the macro cell in a same subframe for the user equipment.

22. The user equipment of claim 16, wherein multiple grants for new data transmission are received from the macro cell in a same subframe for the user equipment.

23. The user equipment of claim 22, wherein uplink acknowledgement and negative acknowledgements use a physical uplink control channel format 1b.

24. The user equipment of claim 22, wherein uplink acknowledgement and negative acknowledgements use a physical uplink control channel format 3.

25. The user equipment of claim 16, further comprising receiving signaling from the macro cell confirming whether synchronous HARQ is to be used.

26. The user equipment of claim 25, further comprising receiving an indication of the predetermined number of HARQ processes.

27. The user equipment of claim 16, wherein a mapping table of downlink and uplink HARQ processes is signaled to the user equipment for a time division duplex network.

28. The user equipment of claim 27, wherein the signaling uses radio resource control signaling.

29. The user equipment of claim 27, wherein the signaling uses MAC control signaling.

30. The user equipment of claim 16, further comprising using asynchronous HARQ between the user equipment and the at least one assisted serving cell.

* * * * *